Oct. 3, 1967    D. H. ANDERSON ETAL    3,345,619
DATA PROCESSING SYSTEM
Filed Oct. 21, 1964    13 Sheets-Sheet 1

TYPE I

TYPE II

INVENTORS
DUANE H. ANDERSON
ROYAL T. McARDELL
RALPH W. NOTTO
BY Thomas J. Nikolai
ATTORNEY

SEQUENCER

FIXED ADDRESS CIRCUITRY

Z-REGISTER

S-REGISTER

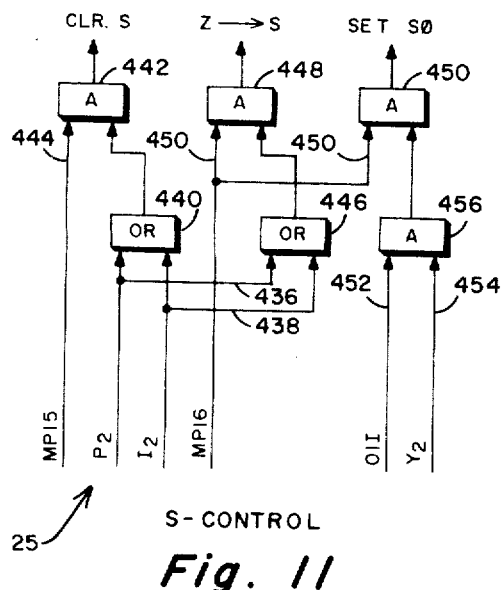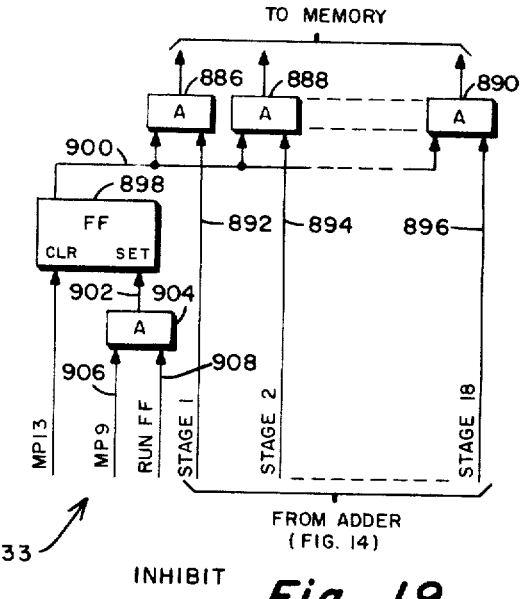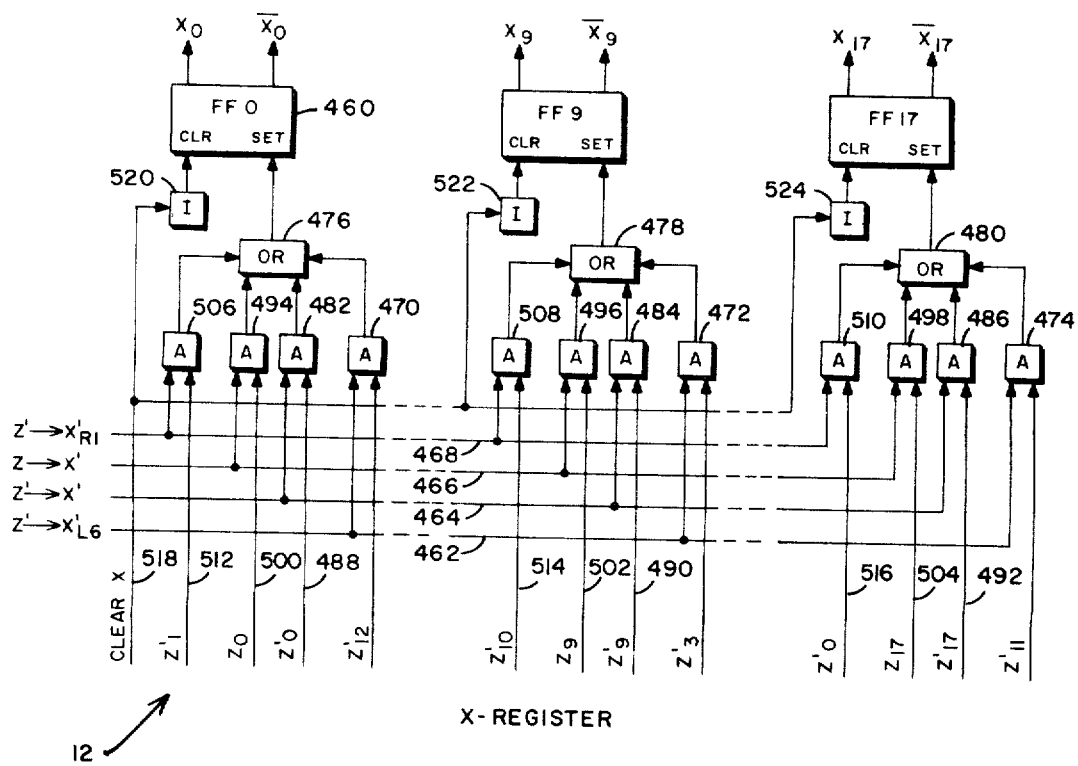

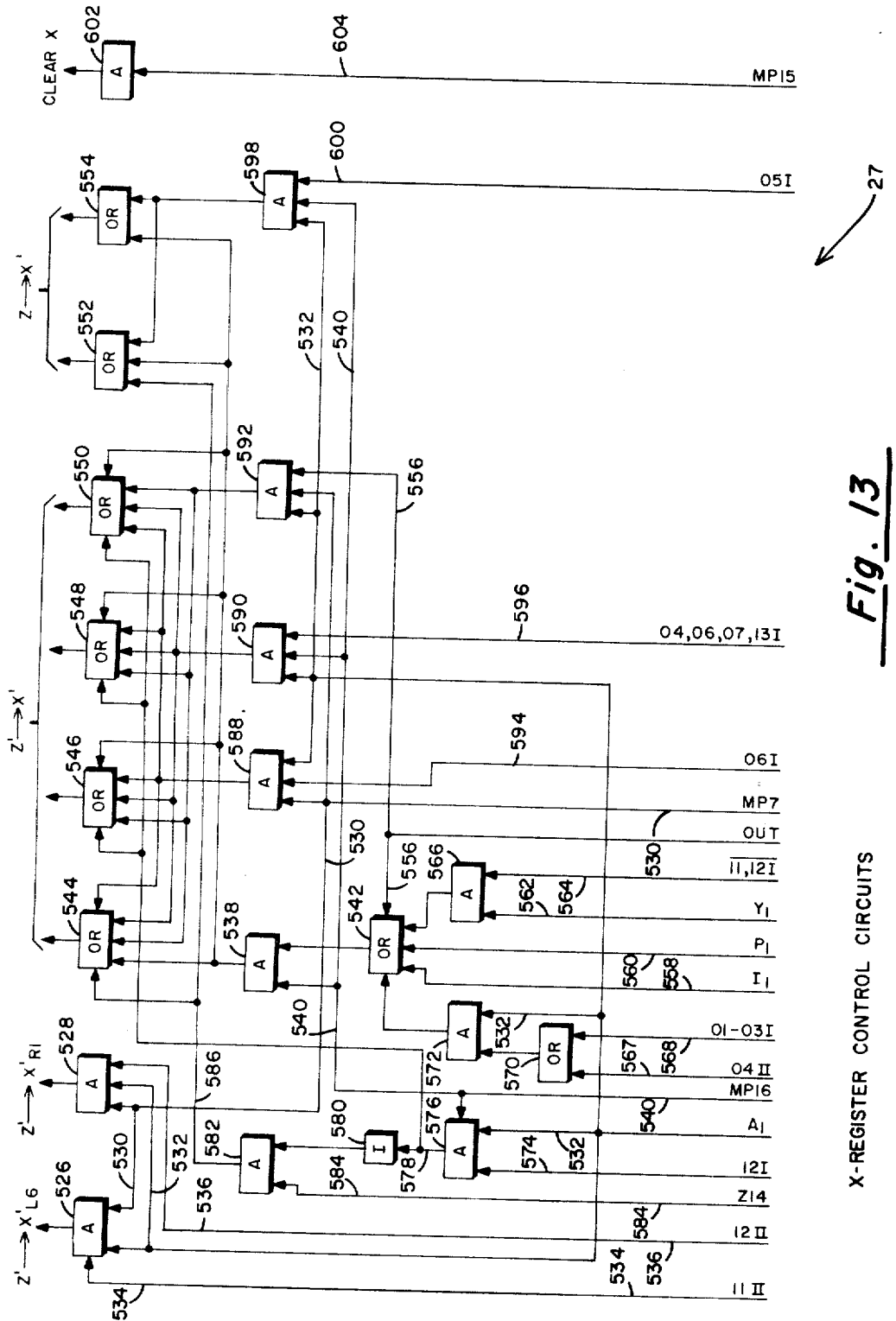

ADDER

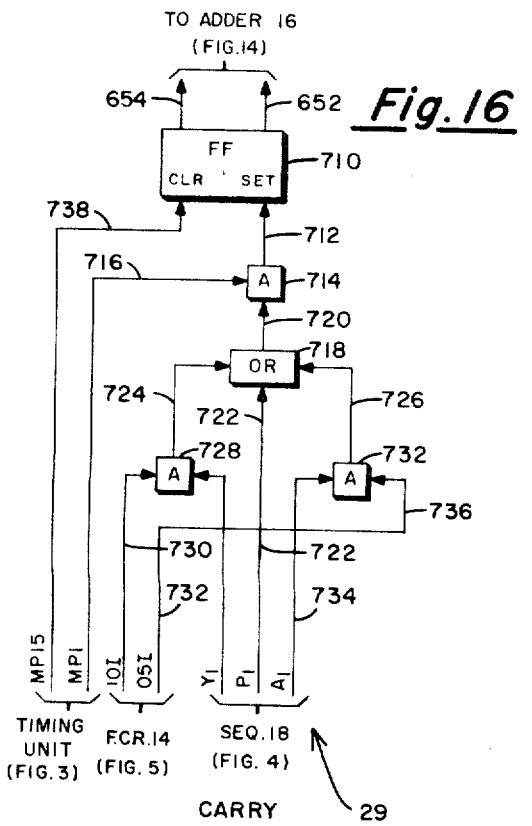
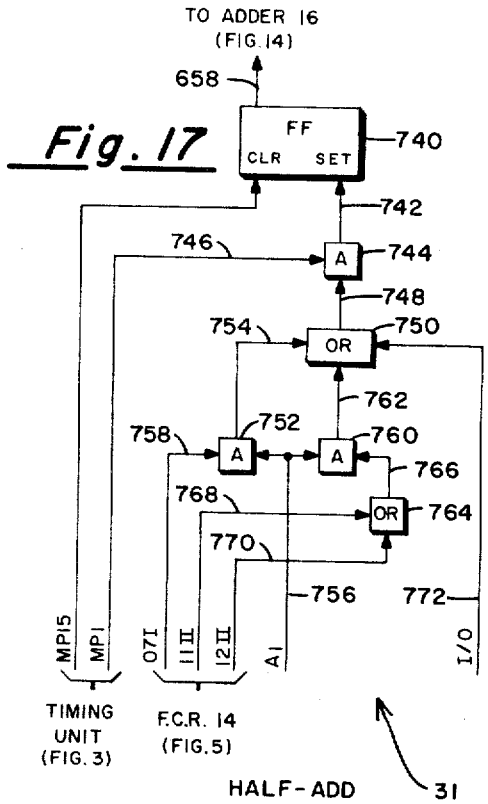

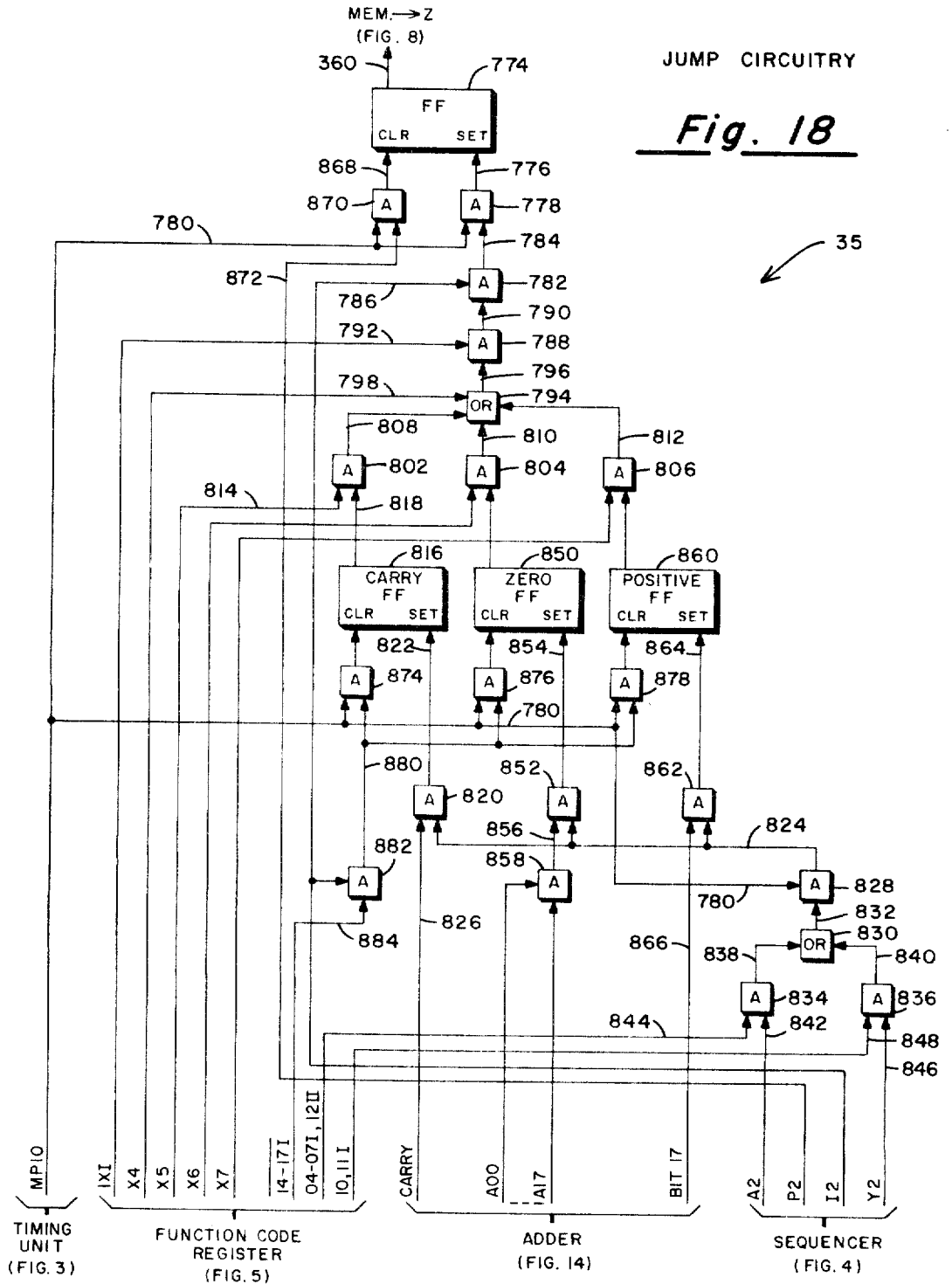

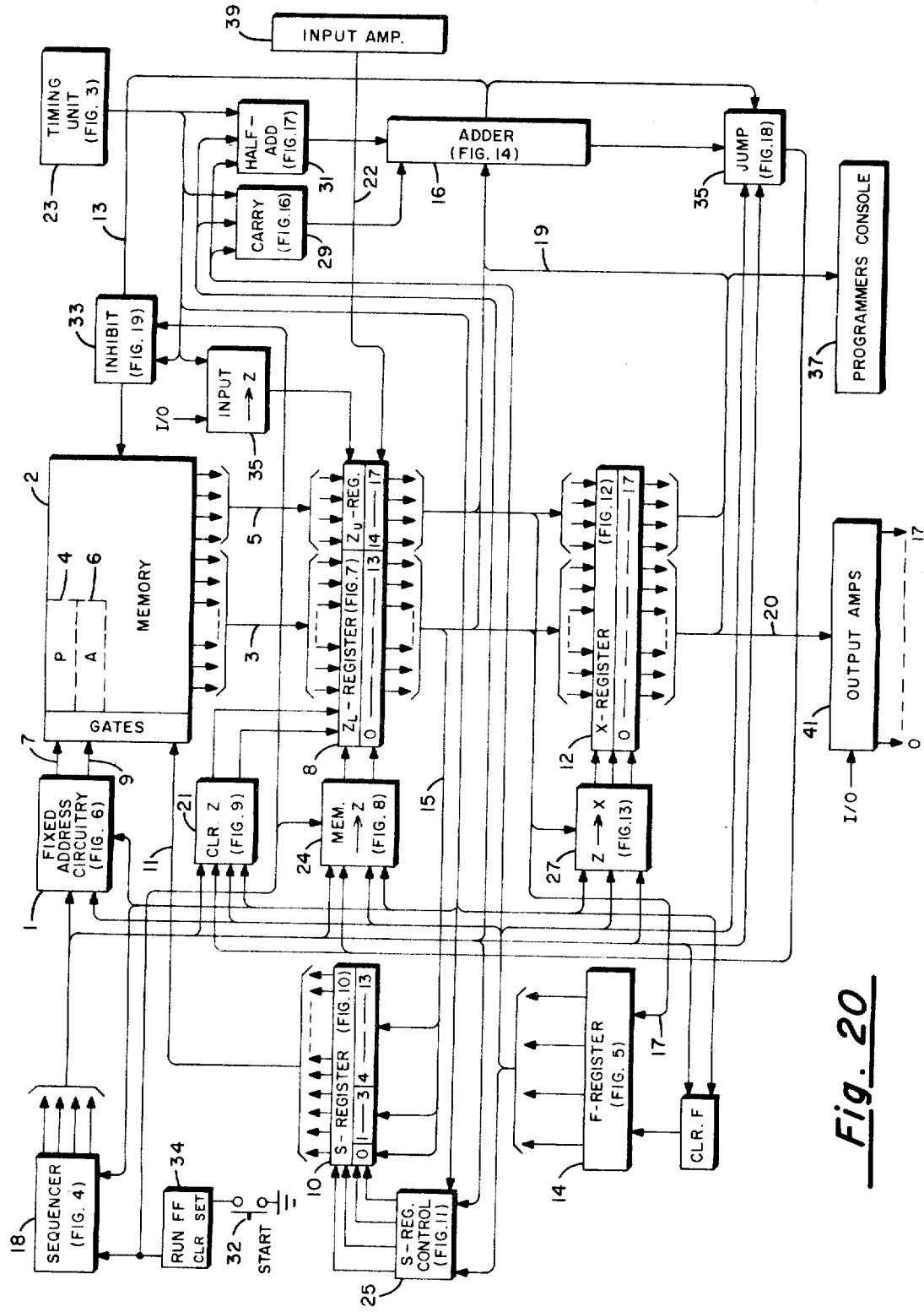

| INSTRUCTION REPERTOIRE ||||||
|---|---|---|---|---|---|
| TYPE | CODE || INSTRUCTION | OPERATION | SEQUENCE |
|  | OCTAL | TYPE |  |  |  |
| XFER | 01 | I | EXECUTE | $P_{0-13} \rightarrow Y_{0-13}$ | PIAYI |
|  | 02 | I | STORE ADDRESS | $A_{0-13} \rightarrow A_{0-13}$ | PIAY |
|  | 03 | I | STORE A | $A \rightarrow Y$ | PIAY |
|  | 12 | I | LOAD CONSTANT | $Y_{0-13} \rightarrow A_{0-13}$ | PIA |
|  | 13 | I | LOAD A | $Y \rightarrow A$ | PIYA |
| ARITH | 04 | I | ADD | $A+Y \rightarrow A$ | PIYA |
|  | 05 | I | SUBTRACT | $A-Y \rightarrow A$ | PIYA |
|  | 06 | I | LOGICAL PRODUCT | $A \odot Y \rightarrow A$ | PIYA |
|  | 07 | I | SEL. COMPLEMENT | $A \oplus Y \rightarrow A$ | PIYA |
|  | 10 | I | INCREMENT | $Y+1 \rightarrow Y$ | PIY |
|  | 11 | I | DECREMENT | $Y-1 \rightarrow Y$ | PIY |
|  | 11 | II | SHIFT A LEFT 6 | $(A)_{L1} \rightarrow X$ | PIA |
|  | 12 | II | SHIFT A RIGHT 1 | $(A)_{R1} \rightarrow X$ | PIA |
| JUMP | 14 | I | JUMP | $Y \rightarrow P$ | PI |
|  | 15 | I | JUMP IF PLUS | $Y \rightarrow P$ | PI |
|  | 16 | I | JUMP IF ZERO | $Y \rightarrow P$ | PI |
|  | 17 | I | JUMP IF CARRY | $Y \rightarrow P$ | PI |
| I/O | 04 | II | ACTIVATE INPUT | $IN \rightarrow Z$ | PIA |
|  | 05 | II | ACTIVATE OUTPUT | $X \rightarrow OUT$ | PIA |
|  | 14 | II | SET L/O |  | PI |
|  | 15 | II | CLEAR L/O |  | PI |
|  | 00 | II | STOP |  | PI |

*Fig. 21*

| SEQUENCE TRANSFER ||||
|---|---|---|---|
| FROM | TO | CODE | TYPE |
| P | I | ALL | I |
|  |  | ALL | II |
| Y | I | 01 | I |
|  |  | NONE | II |
| I | Y | 04-07,10,11,13 | I |
|  |  | NONE | II |
| A | Y | 01-03 | I |
|  |  | NONE | II |
| I | A | 01-03, 12 | I |
|  |  | 04,05,11,12 | II |
| Y | A | 04-07,13 | I |
|  |  | NONE | II |
| I | P | 14-17 | I |
|  |  | 14,15 | II |
| Y | P | 02,03 | I |
|  |  | 10,11 | II |
| A | P | 04,07,12,13 | I |
|  |  | 04,05,11,12 | II |

*Fig. 22*

INSTRUCTION CODE DERIVATION

| 1 | 2 | | | 3 | | | | | | | | 4 |
|---|---|---|---|---|---|---|---|---|---|---|---|---|
| OCTAL CODE | BINARY REPRESENTATION | | | ACTUALLY USED | | | | | | | | TYPE |
| | | | | 17 | 16 | 15 | 14 | 13 | 12 | 11 | 10 | |
| 01 | | 000 | 001 | 0 | 0 | 0 | 1 | | | | | I |
| 02 | | 000 | 010 | 0 | 0 | 1 | 0 | | | | | I |
| 03 | | 000 | 011 | 0 | 0 | 1 | 1 | | | | | I |
| 04 | | 000 | 100 | 0 | 1 | 0 | 0 | | | | | I |
| 05 | | 000 | 101 | 0 | 1 | 0 | 1 | | | | | I |
| 06 | | 000 | 110 | 0 | 1 | 1 | 0 | | | | | I |
| 07 | | 000 | 111 | 0 | 1 | 1 | 1 | | | | | I |
| 10 | | 001 | 000 | 1 | 0 | 0 | 0 | | | | | I |
| 11 | | 001 | 001 | 1 | 0 | 0 | 1 | | | | | I |
| 12 | | 001 | 010 | 1 | 0 | 1 | 0 | | | | | I |
| 13 | | 001 | 011 | 1 | 0 | 1 | 1 | | | | | I |
| 14 | | 001 | 100 | 1 | 1 | 0 | 0 | | | | | I |
| 15 | | 001 | 101 | 1 | 1 | 0 | 1 | | | | | I |
| 16 | | 001 | 110 | 1 | 1 | 1 | 0 | | | | | I |
| 17 | | 001 | 111 | 1 | 1 | 1 | 1 | | | | | I |
| 0000 | 000 | 000 | 000 | 0 | 0 | 0 | 0 | 0 | 0 | 0 | 0 | II |
| 0004 | 000 | 000 | 000 | 100 | 0 | 0 | 0 | 0 | 0 | 1 | 0 | 0 | II |
| 0005 | 000 | 000 | 000 | 101 | 0 | 0 | 0 | 0 | 0 | 1 | 0 | 1 | II |
| 0011 | 000 | 000 | 001 | 001 | 0 | 0 | 0 | 0 | 1 | 0 | 0 | 1 | II |
| 0012 | 000 | 000 | 001 | 010 | 0 | 0 | 0 | 0 | 1 | 0 | 1 | 0 | II |
| 0014 | 000 | 000 | 001 | 100 | 0 | 0 | 0 | 0 | 1 | 1 | 0 | 0 | II |
| 0015 | 000 | 000 | 001 | 101 | 0 | 0 | 0 | 0 | 1 | 1 | 0 | 1 | II |

*Fig. 23*

United States Patent Office 3,345,619
Patented Oct. 3, 1967

3,345,619
DATA PROCESSING SYSTEM
Duane H. Anderson, Roseville, Royal T. McArdell, St. Paul, and Ralph W. Notto, White Bear Lake, Minn., assignors to Sperry Rand Corporation, New York, N.Y., a corporation of Delaware
Filed Oct. 21, 1964, Ser. No. 405,443
7 Claims. (Cl. 340—172.5)

ABSTRACT OF THE DISCLOSURE

A stored program digital computer adapted for a parallel manipulation of data word digits and having an addressable memory system is described. For economy, a program address storage and the accumulator register are included at fixed locations in the memory. The memory also stores data words and instruction words, each instruction word including a function code for defining the computer operation to be performed and a data word address where a data word is to be read from or stored. In addition to timing circuitry for providing gating control signals, a variable sequencer is described. The variable sequencer is capable of providing four discrete sequence enabling signals, each of which activates a particular subfunction, but not all of which are used during any given instruction. The order of the sequence signals is determined by the function code portion of each instruction. Fixed address circuitry for accessing the program address storage and the accumulator register during predetermined ones of the sequences is also described. An arithmetic system wherein results are stored directly from the adder into the memory without requiring intermediate storage holding registers is also described.

Table of Contents

| | Column |
|---|---|
| Introduction | 2 |
| General Arrangement | 5 |
| The Instruction Word | 7 |
| Function Code Bits | 7 |
| The Timing Unit | 8 |
| Sequencer | 8 |
| Function Code Register | 10 |
| Fixed Address Circuitry | 12 |
| Z Register | 13 |
| Input Amplifiers to Z Register | 13 |
| Z Register Control | 13 |
| Memory to $Z_{14-17}$ Inhibited | 13 |
| Memory to $Z_{0-13}$ Inhibited | 14 |
| Memory to $Z_{0-17}$ Inhibited | 14 |
| Clear Z Register | 14 |
| Clear $Z_{0-13}$ | 14 |
| Clear $Z_{14-17}$ | 14 |
| Clear $Z_{0-17}$ | 15 |
| S Register | 15 |
| S Register Control | 15 |
| Clear S | 16 |
| Transfer Z to S | 16 |
| Set $S_{1,2}$ | 16 |
| X Register | 16 |
| Z to X Left 6 | 16 |
| Z Directly to X | 16 |
| Z Complemented to X | 16 |
| Z to X Right 1 | 17 |
| Clear X Register | 17 |
| X Register Control Circuitry | 17 |
| Z to X Left 6 | 17 |
| Z to X Right 1 | 17 |
| Set X | 18 |
| Z′ Directly to X′ | 18 |
| $Z'_{14}$ to $X'_{14-17}$ | 18 |
| $Z_{0-13}$ to $X_{0-13}$ | 18 |
| $Z_{0-17}$ to $X_{0-17}$ | 19 |
| $Z_{0-17}$ to $X'_{0-17}$ | 19 |
| Clear X | 19 |
| Summary of X Register | 19 |
| Summary of X Register Control Circuitry | $1_9$ |

Table of Contents—Continued

| | Column |
|---|---|
| Adder Generally | 19 |
| Full Adder | 20 |
| Half-Adder | 22 |
| Carry Circuitry | 23 |
| Half-Add Control | 23 |
| Jump Instruction Control | 24 |
| Unconditional Jump | 24 |
| Conditional Jump | 25 |
| Set Carry Status Designator | 25 |
| Set "0" Status Designator | 25 |
| Set Positive Status Designator | 25 |
| Status Designator Summary | 25 |
| Clear Jump Flip-Flop | 25 |
| Clear Status Designators | 25 |
| Jump Circuit Summary | 26 |
| Adder to Memory Inhibit | 26 |
| General Computer Operation Summary | 26 |

Introduction

This invention relates generally to a digital computer especially suitable for process control applications and more specifically to a very small, low cost, parallel, binary, digital, general purpose, real time computer which performs arithmetic operations with the accumulator, program address register, or other addressed locations between the read-write memory cycle during which the implied or addressed memory location is accessed such that the result is placed into the said location during the write portion of the same memory cycle and so that the paths to the adder need not be gated. This concept allows the construction of the computer with only two transistor data registers, one memory address register, one function code register, an adder, and control circuitry which is much simpler than presently existing computers having similar speeds and functions.

In the past, computers have found wide application in the processing of large masses of data and in solving problems of a scientific nature. More recently, industry has been investigating the possibility of utilizing digital computing equipment for process control. For example, there exists in industry today a need for a computer to control rapid transit vehicles, supervise movement of vehicles such as trains, control water distribution systems, provide integrated power system control, regulate blending of liquids, sequence cracking and regeneration cycles of a petroleum cracking plant, etc. Presently existing computers are completely capable of being used in such control systems. However, in many instances, their cost and complexity prohibit their use in such systems.

At present, a large portion of the total potential market for industrial control computer systems is not being served by any computer manufacturer, due primarily to the fact that even the smallest of the presently available computers has more capacity and complexity and, hence higher cost, than is required in many potential applications. The general requirement for these presently unserved applications is for a computer with a rather large, fast, random-access memory but having only limited logical and arithmetic computational abilities, whereas the bulk of present computers have the opposite characteristic, i.e., a small memory in relationship to their computational abilities. In the industrial control market area, low cost is of much greater importance than high internal computational speed because the primary use of the system will be to control an environment rather than perform complicated calculations.

As is well known in the art, computers operate by executing a sequence of instruction words called a program, the instructions causing the machine to operate upon or process data.

An instruction word is the first or primary indication to the computer of an instruction. It dictates the function to be performed and causes a succession of electrical signals conveniently termed "commands" which control events in the processing or arithmetic unit or other portions of the computer. Usually, the instruction words indicative of the instructions to be executed in a program of instructions are located in the storage media at successive addresses. Thus, if the program address register is advanced or increased by 1 each time an instruction is transferred from memory, the memory address indicated by the state of the program address register after it has been increased is the location of the next instruction word to be accessed.

Each instruction word will call out one or more steps to be performed by various elements in the computer during the time interval alloted for that word. It is clear then that the more functions or steps which can be performed in the time interval for each word, the faster the computer will operate. However, to perform several steps simultaneously or within the time interval for one instruction word, sufficient computer components (hardware) must be available to enable each function to be performed or to be held while awaiting a further operation to take place during the execution of a later instruction word. Thus, for arithmetic functions which are seldom used, a computer must have elements which will enable it to perform the function rapidly; however, during the time interval in which this function is not being performed, the elements are merely added components which increase the complexity, size, and cost of the computer. Therefore, it can be seen that the faster a computer must be, the more complex it becomes and the instruction repertories become more complicated.

With a view towards producing a small, economical computer which can be used in most industrial control systems, studies were started in the area of the frequency of uses of individual computer instructions and programs for a plurality of different computers were studied to determine which instructions in the repertoire are most important in terms of frequency of use. The study revealed that very few instructions were used more than 5% of the time. The statistics cannot be followed blindly, of course, since some types of instructions are not easily included in some computer designs and some important instructions (such as input/output) are not used frequently, but the computer is of no use without them.

In summary, present computers have a large number of instructions of which only one can be used at any given time. The hardware associated with an instruction is idle except when the instruction is being used. Studies were conducted which show that only a very small number of instructions are used most of the time as shown in Table I. The present invention was designed to take advantage of this principle by offering only those instructions used most often to minimize the hardware. To these basic instructions, a few others were added so that more complicated operations can be programmed.

Another consideration is the type of problems for which the computer is intended. The samples used in this study were taken from a variety of applications so that the net effect would reflect the requirements for a general purpose computer. The results of the study performed can be used to justify the following: (1) it is not necessary that a computer have index registers for address modification if a program loop can be controlled with other instructions in the repertoire, since the use of the indexing feature in a program is also only 3%; (2) a programmed multiply and divide is permissible; (3) the frequency of use of the add instruction in a program is only 5% and the use of an add and replace in memory instruction is 4%; therefore, adding directly to the memory in lieu of an accumulator is not necessarily a burden on the programmer.

TABLE I.—ANALYSIS OF COMPUTER REPERTOIRES [1]

| Instruction | Frequency (Percent) | Accumulative Frequency (Percent) |
|---|---|---|
| Transmit Data [2] | 33.7 | 33.7 |
| Direct Jump | 14.0 | 47.7 |
| Shift | 7.1 | 54.8 |
| Return-Jump | 5.0 | 59.8 |
| Add | 5.0 | 64.8 |
| Compare | 5.0 | 69.8 |
| Add, Replace | 4.2 | 74.0 |
| Zero Test | 3.2 | 77.2 |
| Index Jump, Skip | 3.1 | 80.3 |
| Subtract | 2.5 | 82.8 |
| Sign Test | 2.4 | 85.2 |
| Logical Product | 2.4 | 87.6 |
| Multiply | 2.3 | 89.9 |
| External Function | 2.0 | 91.9 |
| Input | 1.6 | 93.5 |
| Other Logical Functions | 1.1 | 94.6 |
| Repeat | 1.1 | 95.7 |
| Complement | 0.9 | 96.6 |
| Subtract, Replace | 0.9 | 97.5 |
| Output | 0.9 | 98.4 |
| Divide | 0.6 | 99.0 |
| Stop | 0.6 | 99.6 |
| Indirect Jump | 0.3 | 99.9 |
| Scale Factor | 0.1 | 100.0 |

[1] Based on samples of programs for the 1103A, Transtec II, M-500, 490, 1107, 49, File and 418 UNIVAC Computers.
[2] Transmit data from or to memory.

From the studies conducted, approximately 10 different groups of instructions, each group of which is called a repertoire, were designed from a statistical analysis of the selected computer functions. From these, the most effective repertoire was chosen, modified for the intended applications, and optimized as far as possible for minimum hardware, Thus, wherever possible in the present computer, elements necessary to perform seldom used instructions were omitted and provisions made to utilize (1) existing components and (2) programming to perform the least used instructions. In other words, in the complex computers most of the elements used to perform instructions were idle 95% of the time. Since these elements were used so infrequently, they were omitted in the present computer and, although a longer time is required when it is necessary to perform the less used instructions, they are performed by (1) means of program instructions and (2) the same elements which are used with the most frequently used instructions.

The basic computer of the present invention uses an 18 bit word and is binary oriented, although the length of the word is not intended to be limiting and may include more or less bits. The Accumulator, A, and Program Address Register, P, are physically contained in the magnetic core memory. The adder structure in the computer has been incorporated (into the memory write cycle) in such a manner that the contents of the Memory Buffer or Z register and the storage register for modified operands or X register are always added and stored during the write portion of every memory cycle. The entire instruction repertoire has been designed around repetitions of this cycle with minor modifications. This has resulted in very few gated paths in the computer and a very small amount of logic in addition to that required to operate the large memory and perform input/output (I/O) operations. Further, it allows direct connections without buffering between the X and Z registers and the adder and between the adder and the memory. The computer does not have multiply or divide instructions. The required system response time also indicated that the higher cost of hardware multiply and divide instructions would not be justified. The addition of a hardware multiply instruction, for example, would require three additional registers in the computer as well as additional control logic. In lieu of the additional control logic, a programmed multiply is used which can be executed in approximately two milliseconds.

Thus, the present invention combines a large magnetic core memory with a minimum amount of control, arithmetic, and input/output logic necessary to perform the desired computer functions. All operational registers (those registers which hold information between instructions) maintained in the core memory. The control logic is designed to permit additions to the accumulator register, the programmed address register, or other addressed locations to be performed during the core memory cycle in which the register is accessed, so that the sum is placed in the memory during the write portion of the same cycle.

The arithmetic section employs binary, one's complement arithmetic, with an 18 bit parallel subtractive type adder. The results of all arithmetic operations are stored directly into memory in either the programmed address register or the accumulator register.

Thus, it is an object of this invention to provide a very small, low cost, parallel, binary, digital, general purpose computer.

It is also an object of this invention to provide a small computer which performs arithmetic operations with the accumulator, program address register, or other address locations between the read/write memory cycle during which the implied or address memory location is accessed such that the result is placed into the said location during the write portion of the same memory cycle.

It is another object of this invention to provide a small computer with an adder the inputs to which need not be gated or buffered and the output of which may be directly coupled to the memory without need of buffering circuits or registers.

It is yet another object of this invention to provide a computer the core memory of which contains all operational registers.

It is also an object of this invention to provide a small binary computer with a one's complement arithmetic section containing a parallel subtractive type adder which stores the results of all arithmetic operations directly into memory in either the programmed address register or the accumulator register.

It is still another object of this invention to provide a small computer which contains an adder which has been incorporated into the memory read/write cycle in such a manner that the contents of the memory buffer register and the storage register for modified operands are always added and stored during the write portion of every memory cycle and in which the entire instruction repertoire has been designed around repetitions of this cycle with minor modifications.

It is also an object of this invention to provide a small computer in which elements necessary to perform seldom used arithmetic operations are omitted and in which program means are provided to perform the same operations in a slightly longer time.

General arrangement

Figure 3:
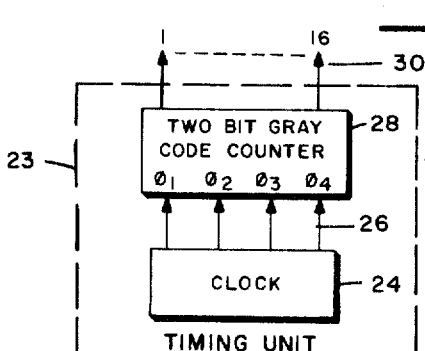
Figure 4:
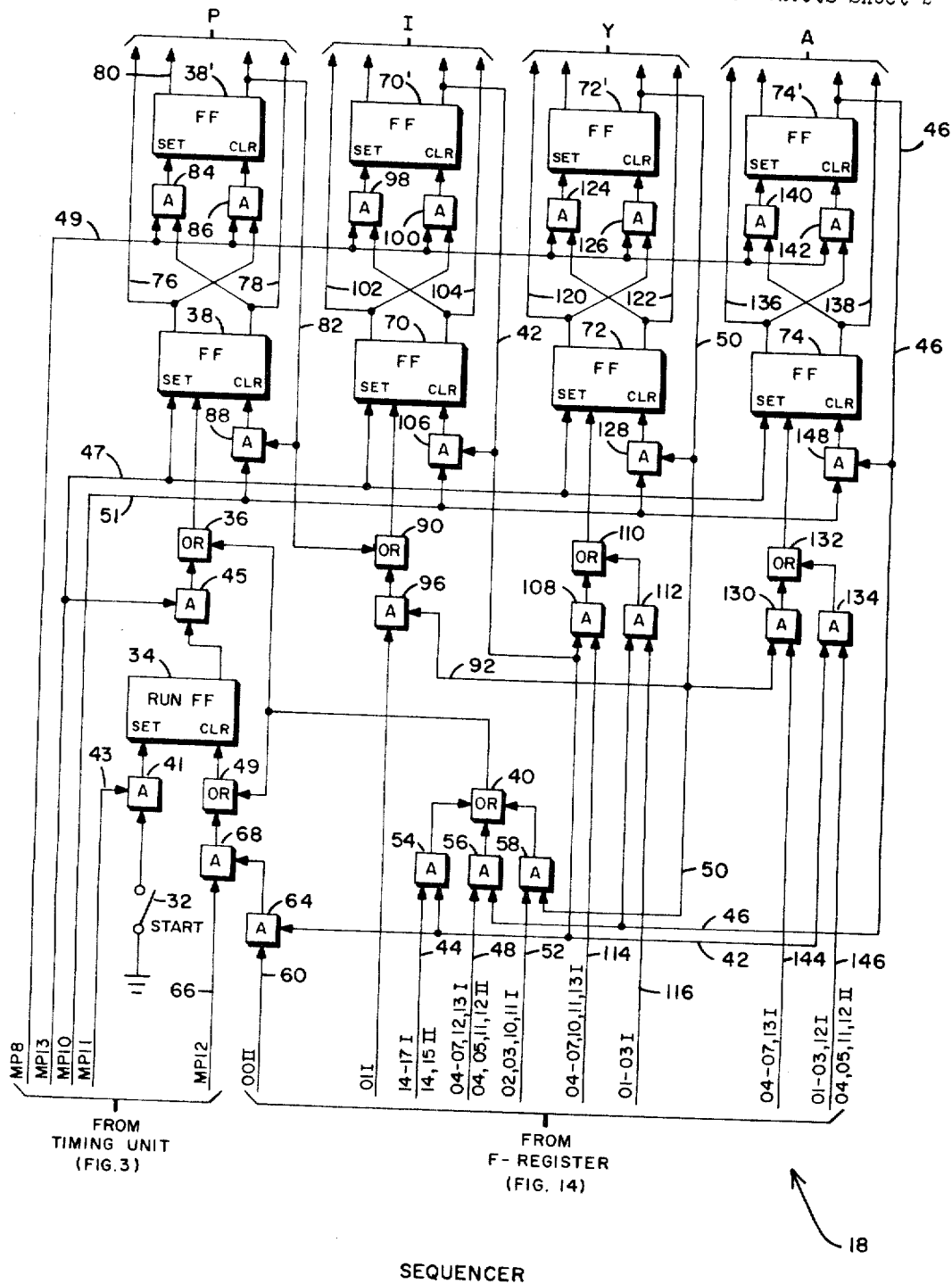
Figure 5:
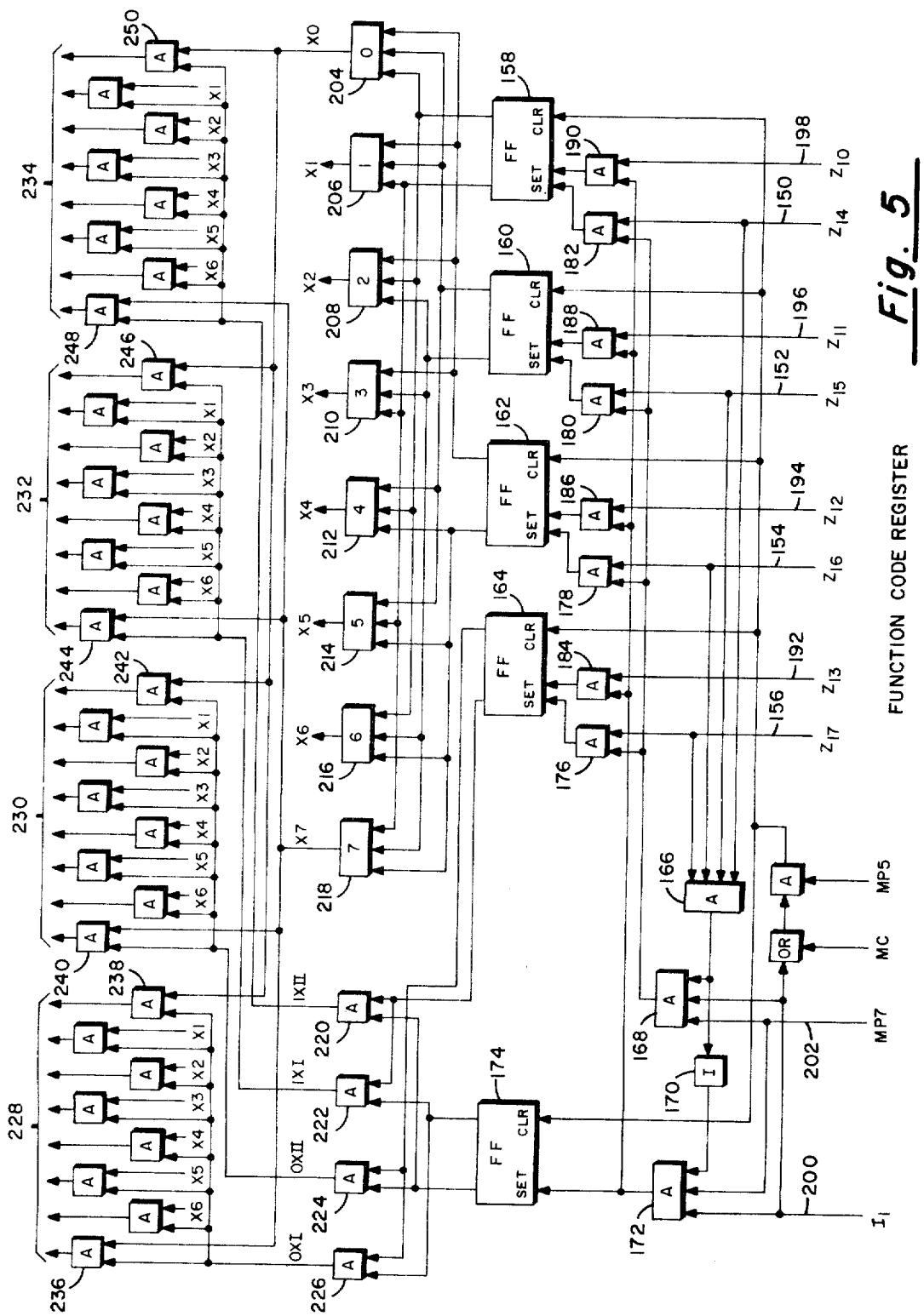
Figure 6:
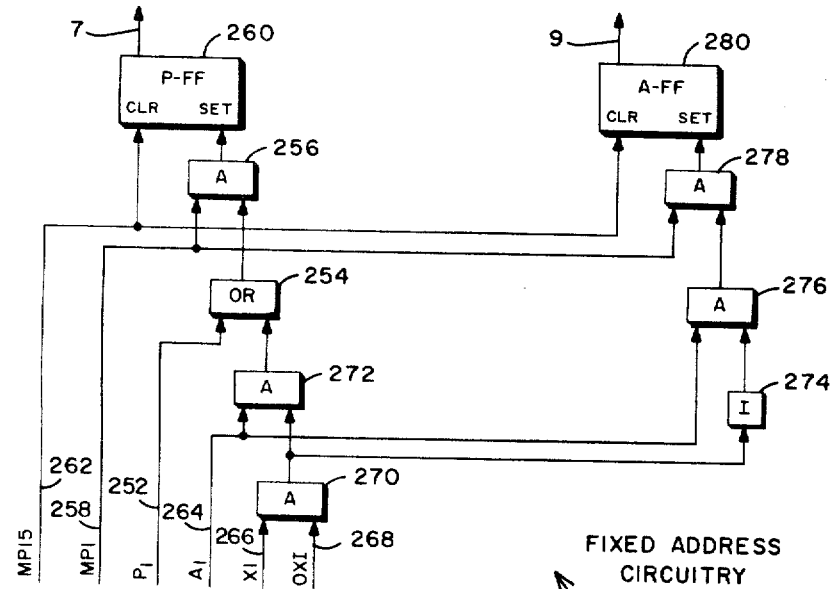
Figure 7:
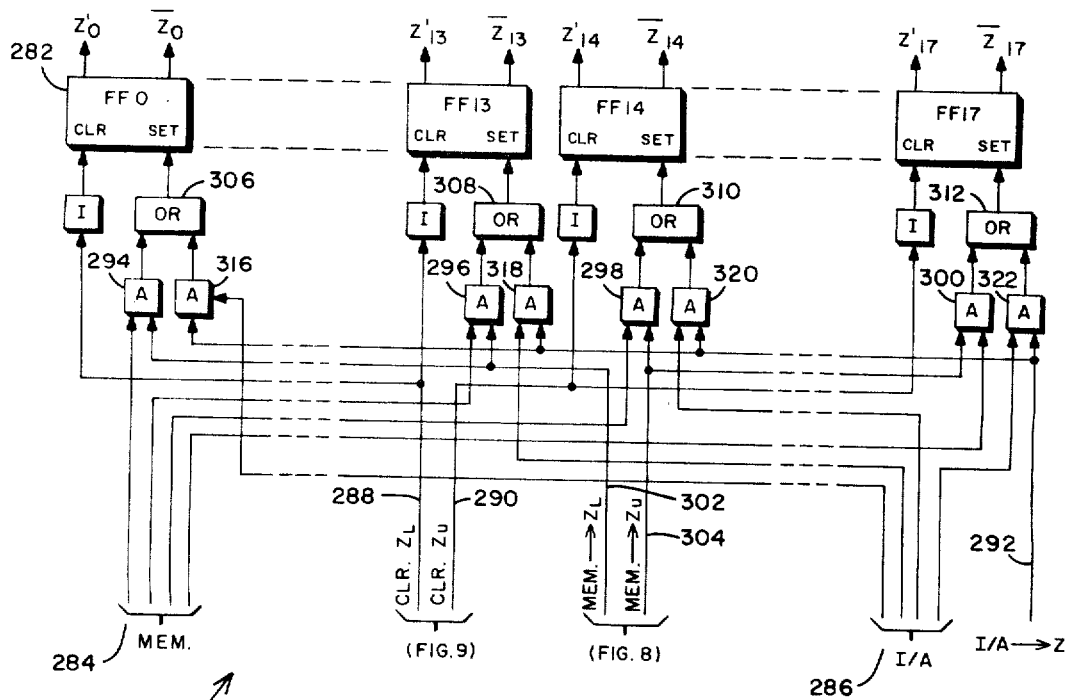
Figures 8, 9:
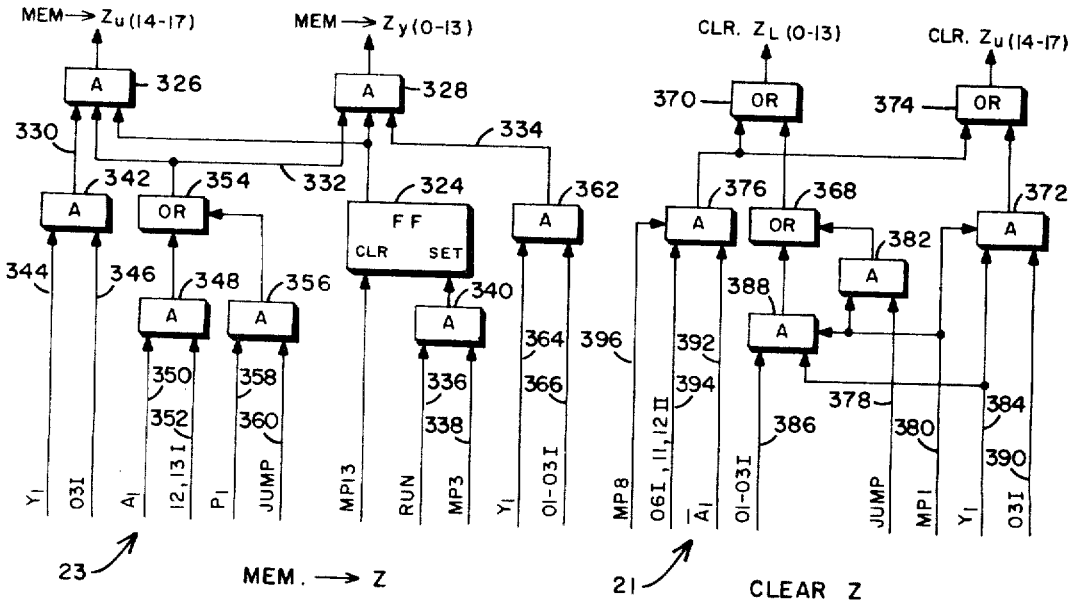
Figure 10:
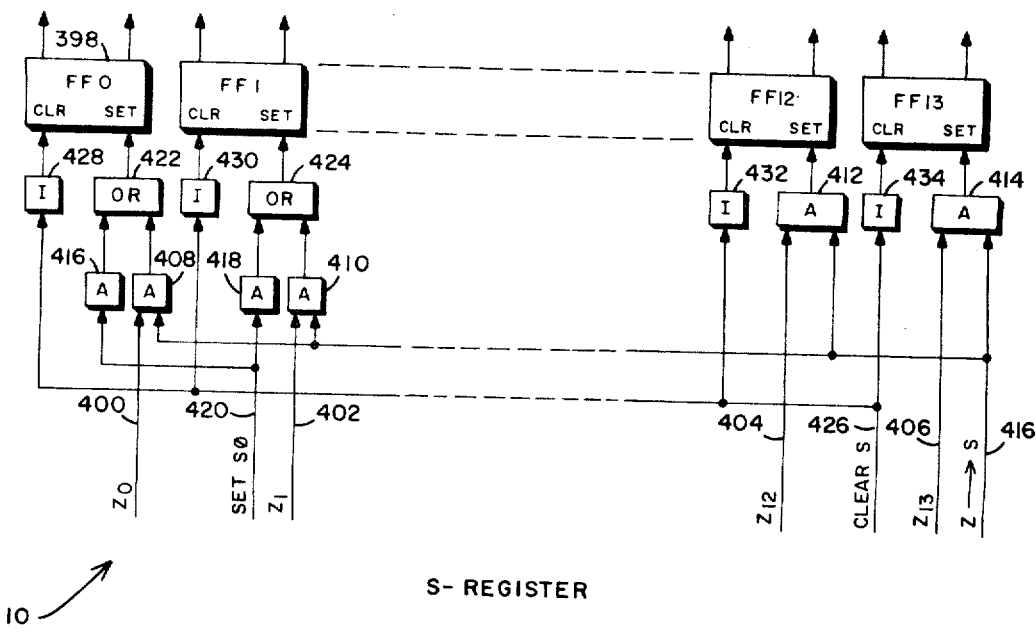
Figure 14:
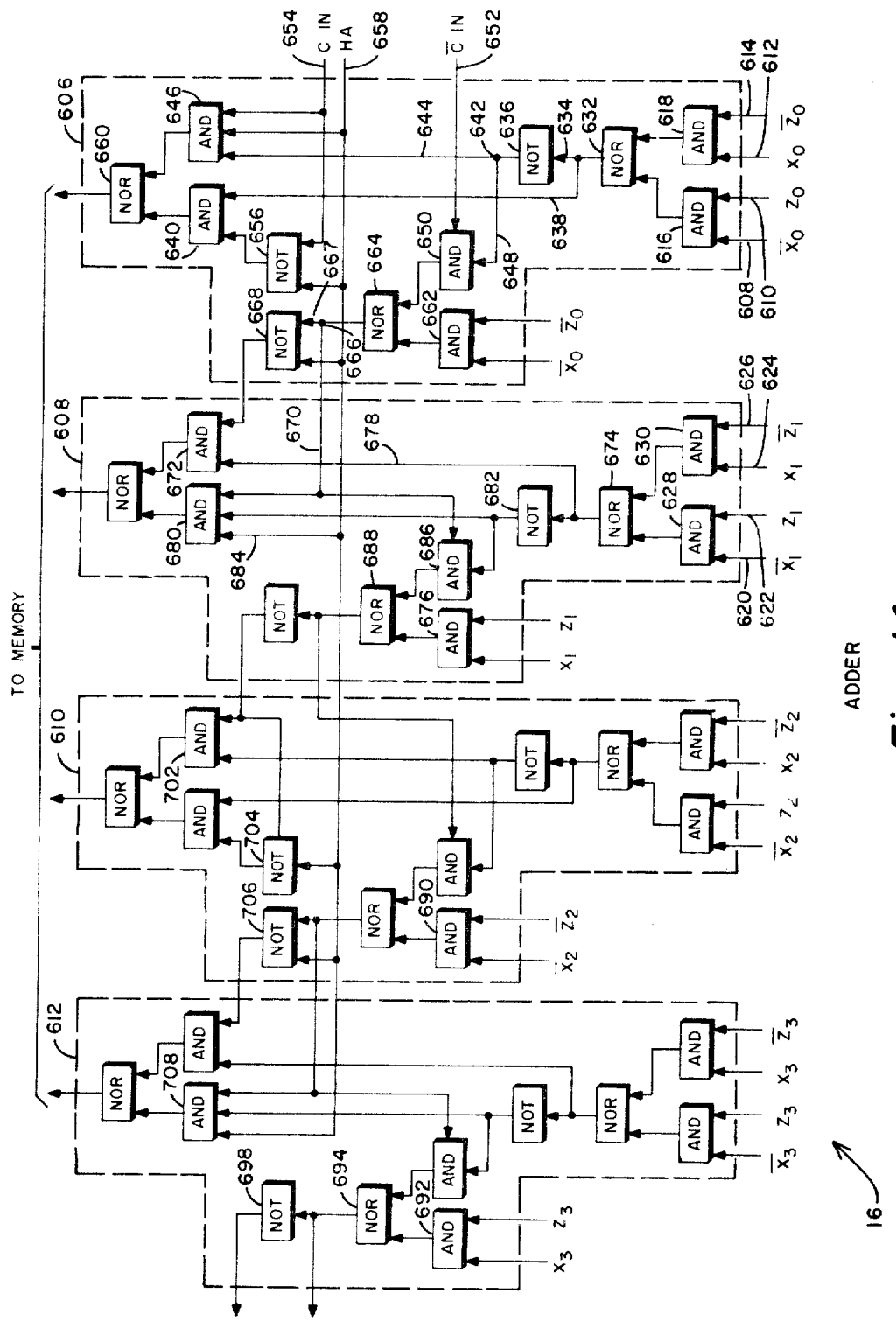

FIG. 3 discloses the timing unit which produces the timing pulses necessary for the present computer;

FIG. 4 is a detailed schematic of the unit which initiates the operational sequences of the computer described herein;

FIG. 5 is a detailed schematic of the register which converts the function codes into appropriate signals;

FIG. 6 is a diagram of the circuitry used to select either the program address word register or the accumulator register in the memory;

FIG. 7 is a functional diagram of the memory output storage register;

FIG. 8 discloses the circuitry necessary for controlling the transfer of information from the memory to the output storage register;

FIG. 9 is a functional diagram showing the circuitry necessary for clearing the output storage register;

FIG. 10 is a diagram of the register for temporarily storing the program address word and the instruction word;

FIG. 11 discloses the circuitry necessary for control of the flow of information to the register which temporarily stores the program address word and the instruction word;

FIG. 12 discloses a functional diagram of a register which temporarily holds a data word from the memory in order that it may be used in arithmetic computations;

FIG. 13 is a functional diagram of the circuits necessary for controlling the flow of information to the register shown in FIG. 12 which is used to store data words to be used in arithmetic computations;

FIG. 14 is a block diagram of the adder used in the present computer;

FIGS. 15a, 15b, 15c and 15d illustrate various truth tables for the adder used in the present invention;

FIG. 16 is a diagram of the circuitry necessary to produce a carry for the adder of the present invention;

FIG. 17 discloses the circuitry necessary for making the adder of the present invention operate as a half-adder;

FIG. 18 is a functional diagram of the circuitry necessary to cause the computer to perform conditional or unconditional jumps in the sequence of operations;

FIG. 19 is a block diagram of the circuitry necessary to allow the output of the adder to be stored in the memory;

FIG. 20 is a general block diagram of the computer of the present invention showing interconnections between elements;

FIG. 21 is a table showing the instrutcion repertoire of the present computer;

FIG. 22 is a table showing the type of function codes which will cause a transfer from one sequence to another; and FIG. 23 is a table showing the relationship between the octal code and the binary representation for that code used by the function code register circuitry.

Figure 1:
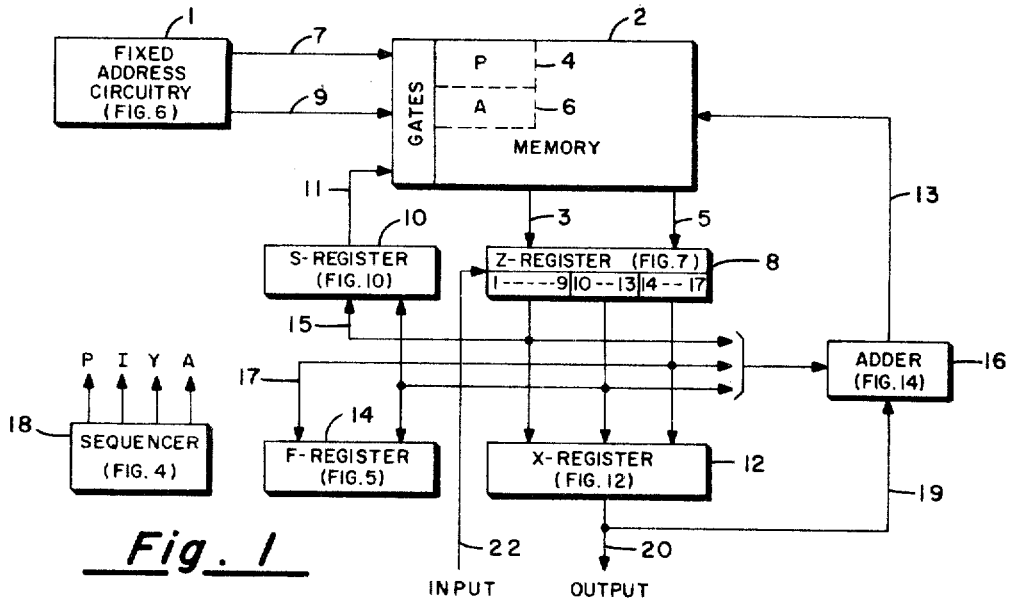
FIG. 1 is a general block diagram of the computer of the present invention.

The general arrangement of the computing machine embodying the present invention is shown in FIG. 1 together with the principle functional units and paths of information flow. As can be seen the principle functional units consist of a magnetic core memory 2, four transient registers, 8, 10, 12 and 14, adder 16, and sequencer 18. Although memory 2 has been specified as a magnetic core memory, it is so specified for illustrative purposes only and may include any known type of memory such as ferroelectric, thin film memory, etc. It has incorporated in it the operational registers 4 and 6 either of which is selected by the Fixed Address circuitry represented by block 1. The operational registers 4 and 6 form an integral part of the memory 2 and are further designated as P and A registers respectively, indicating a Programmed Address Register and an Accumulator Register. They are termed operational registers because they are referred to by instructions in the program. Data that is placed in these registers is retained until it is replaced by new data. Transient registers 8, 10, 12 and 14 are used for the manipulation of instruction and data words during processing. They do not retain information from one operation to the next. Sequencer 18 provides a series of distinct steps of specified operations in accordance with the computer control circuitry. These steps are termed the P sequence, I sequence, Y sequence and the A sequence. The P sequence obtains the address of the next instruction word from the P or Programmed Address Register in the memory and transfers that address to the memory buffer or Z register which is external to the memory. The I sequence uses the instruction word address in the external register to read the desired instruction word from the memory location. The Y sequence utilizes the instruction word obtained in the I sequence to locate and transfer the operand from the memory address to an external register. The Y sequence is also used to return information from the external registers to a designated location in the memory. The A sequence always transfers the Accumulator information from the memory to the Z register with one exception at which time it reads the programmed address information from the P register in the memory to the Z register. During this sequence the contents of the Z register can be transferred to the X register and the arithmetic results obtained from manipulating the data in the X and Z registers may also be transferred and restored to the Accumulator. Thus, observing FIG. 1, it can be seen that during the P sequence, the Fixed Address circuitry 1 causes the programmed address located in P register 4 to be transferred to Z register 8, the memory in memory 2 to be transferred to Z register 8, the memory buffer, from which it is transferred to S register 10, the memory instruction or operand address register. This information now stored in S register 10 tells where in memory 2 the instruction word is located and causes the instruction word to be transferred to Z register 8.

The instruction word

Figure 2A:
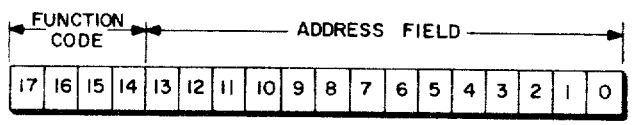
FIGS. 2a and 2b show the two types of instruction words used by the computer.
Figure 2B:
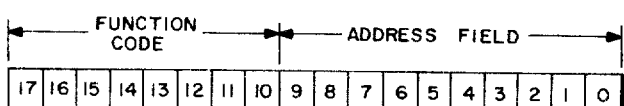

The instruction word as shown in FIGS. 2a and 2b may be either Type I or Type II. The Type I instruction word utilizes the upper 4 bits, or $Z_U$, to denote the function code and the lower 14 bits, or $Z_L$, to indicate the address field. Thus, in the octal notation, if the function code were expressed as 07, bit 17 would contain a 0 and bits 14 through 16 would each contain a 1. Similarly, if the function code were expressed octally as 01, bit 17 would contain a 0, bits 15 and 16 would contain 0's and bit 14 would contain a 1. Twenty-two function codes are used in the program of the present computer. The highest function code which can be represented octally by bits 14 through 17 is octal code 17 which consists of all 1's in bit position 14–17. The Type II instruction word was added to accommodate those function codes which could not be expressed in the Type I format. The Type II format is shown in FIG. 2b. If all 0's are in bit positions 14 through 17, this, will be represented in the octal code by 00. Bits 10 through 13 may be used in a manner similar to bits 14 through 17 in the Type I format. That is, if function code 01, expressed octally, is to be used, a 0 will appear in bit position 13 and also bit positions 11 and 12 while a 1 bit will appear in bit position 10. Thus, the function code expressed octally would read 0001.

As stated previously, during the I sequence the instruction word, either of the Type I or Type II format, is read from the memory 2 to Z register 8. If it is of the Type I format, bits 14–17, ($Z_U$), which indicate the function to be performed by the computer, are transferred from Z register 8 to F register 14, the Function Code Register. If the instruction word is of the Type II format, bits 10–17 are transferred to F register 14. Bits 1–9 or 1–13, ($Z_L$), depending upon the instruction word format, contain the address of the operand in the memory and are transferred from Z register 8 to S register 10.

Function code bits

Function code bits $Z_U$ which are now in the F register may cause the computer to do one of several things. First, they may cause the computer to stop. Secondly, they may cause the computer to initiate a jump instruction which will cause the computer to reenter the P sequence. Third, they may cause the computer to enter the A sequence and fourth, they may cause the computer to enter the Y sequence. If the A sequence is entered, the computer may either transfer information from the Programmed Addess Register in the memory to the Z or memory buffer register 8 or it may transfer information from the Accumulator Register 6 in memory to 2 to the Z or memory buffer register 8 or it may transfer information stored in the Z register 8 to the X or storage register 12 for modified operands. If a Y sequence is initiated, information may be transferred from anywhere in memory 2 other than the Programmed Address Register 4 or the Accumulator Register 6 to the Z register 8 or information may be transferred from the Z register 8 to any location in memory 2 other than the Programmed Address Register 4 or the Accumulator 6. All computer operations are caused by variations of the P, I, A and Y sequences.

The timing unit

The timing pulses for the computer of the present invention are produced by timing unit 23 shown in FIGURE 3 which consists of timing clock 24 and a "gray code" converter 28. Clock 24 produces 4 pulses or phases on lines 26 each of which have a period of 1.2 microseconds and a total cycle time of 4.8 microseconds. These four phases are fed via lines 26 to "gray code" counter 28, which is well known in the art, where they are subdivided to produce 16 main pulses on lines 30 in the 4.8-microsecond cycle time. These 16 main pulses are distributed via lines 30 to various elements throughout the computer.

Sequencer

FIG. 4 is a detailed circuit diagram of Sequencer 18. It produces signals which initiate a plurality of sequential computer operations. These sequences are P, I, Y and A. As can be seen in the sequence column of the Instruction Repertoire in FIG. 21 all instructions begin with the P sequence. Regardless of the sequence which ended the previous instruction, whether it be I, A or Y, the following instruction must begin with the P sequence. Further when the computer is first energized, it must enter the P sequence. Therefore, FIG. 4 shows four ways in which the P sequence can be initiated. First, closing start switch 32 causes an output from AND gate 41 if MP11 is present as an input to AND gate 41 on line 43. This output sets RUN flip-flop 34, the output of which passes through AND gate 45 if MP13 is present on line 47. The output of AND gate 45 passes through OR gate 36 to set flip-flop 38 which initiates the P sequence. Flip-flop 38 may also be set, and thus the P sequence entered, by a signal passing through OR gates 36 and 40. This signal may be generated in three ways. First by AND gate 54 which has as inputs the combination of the $I_2$ sequence signal on line 42 and any of the function code signals 14–17 of the Type I format or 14 or 15 of the Type II format. Secondly, by AND gate 56 and the $A_2$ sequence signal applied to it on line 46 and a signal on line 48 produced by any of function codes 04–07, 12 or 13 of the Type I format or 04, 05, 11 or 12 of the Type II format. Third, by AND gate 58 and the $Y_2$ sequence signal on line 50 and the signal on line 52 produced any function code 02, 03, 10 or 11 of the Type I format. Thus, considering function code 14 I of the the Instruction Repertoire shown in FIG. 21, it can be seen that this instruction is accomplished in two sequences, the P sequence and the I sequence. Therefore, the next instruction which follows the Jump instruction 14 I must beging with a P sequence. Looking at FIG. 4, it can be seen that if a signal produced by function code 14 I is energizing line 44, and the $I_2$ sequence is in progress and energizing line 42, AND gate 54 will pass a signal through OR gate 40 and OR gate 36 to the set side of $P_1$ sequence flip-flop 38 where, when main pulse 13 is also applied to the set side on line 47, flip-flop 38 will change gates and the $P_1$ sequence will be entered. Thus, all function codes except two will be applied to either line 44, 48 or 52 to cause the $P_1$ sequence to be entered. As can be seen from the Instruction Repertoire in FIG. 21, code 00 Type II is a STOP instruction and if, during the I sequence, code 00 Type II is received in an instruction word, signals will be generated on lines 60 and 42 which will cause an output from AND gate 64. This output when combined with main pulse 12 on line 66, causes an output from AND gate 68 which passes through OR gate 49 and clears RUN flip-flop 34 and stops the computer. Thus, this is one of the instructions which will not cause the computer to enter the P sequence. The second will be discussed later. It will be noted that each sequence channel, P, I, Y and A, contains two flip-flops, the output of one of which provide inputs to the other. Thus, flip-flops 38 and 38' are found in the P sequence channel, 70 and 70' in the I sequence channel, 72 and 72' in the Y sequence channel, and 74 and 74' in the A sequence channel. The first flip-flop in the P channel may therefore be called in the $P_1$ flip-flop and the other the $P_2$ flip-flop. Since each flip-flop has two outputs, one from the set side and one from the clear side, there will be for four outputs from each sequence channel, i.e., $P_1$ (0), $P_1$ (1), $P_2$ (0) and $P_2$ (1). Similar notations are used to describe the output of the remaining channels wherein the letter designating the particular channel is used instead of the latter P. The two flip-flops are used in each channel to enable each individual channel to be energized and deenergized at the proper time. When $P_1$ flip-flop 38 is set, it will provide outputs on lines 76 and 78 and also provide inputs to AND gates 84 and 86. When main pulse 8 is also applied to AND gates 84 and 86 on line 49, $P_2$ flip-flop 38' will be set and provide outputs on lines 80 and 82. On main pulse 10, two pulses later, the output from $P_2$ flip-flop 38' on line 82 will be ANDed with main pulse 10 on line 51 in AND gate 88 to clear $P_1$ flip-flop 38.

Not only is the output of $P_2$ flip-flop 38' on line 82 used to clear $P_1$ flip-flop 38, but it also passes through OR gate 90 to the set side of $I_1$ flip-flop 70 thus initiating the I sequence when main pulse 13 is also applied to the set side of flip-flop 70 on line 47. Thus, it can be seen that the I sequence naturally follows the P sequence. As may be seen from the Instruction Repetoire in FIG. 21, the I sequence is always entered following the P sequence except when an 01 function code or an "Execute" instruction is being performed. At that time the I sequence is entered following the Y sequence. This, therefore, is the second code previously mentioned which will not cause the computer to enter the P sequence. Therefore, referring to FIG. 4, if a signal is present on line 92 indicating that the $Y_2$ sequence is in progress and a signal on line 94 indicating an 01 Type I command, AND gate 96 provides an output which passes through OR gate 90 and sets $I_1$ flip-flop 70 when main pulse 13 is also present at the input of flip-flop 70 on line 47. $I_1$ flip-flop 70 not only provides outputs on lines 102 and 104, it also provides inputs to AND gates 98 and 100 which, when main pulse 8 is present on line 49, causes $I_2$ flip-flop 70' to change states. The output of $I_2$ flip-flop 70' on line 42 is used to clear $I_1$ flip-flop 70 through AND gate 106 if main pulse 10 is present on line 51. As may be seen in the Instruction Repertoire in FIG. 21 and the Sequence Transfer in FIG. 22, the Y sequence may be entered from either the I sequence or the A sequence depending upon the particular code involved.

If the $I_2$ sequence is in progress and producing a signal on line 42 and 04–07, 10, 11 or 13 Type I function code will cause a signal on line 114 which, when ANDed with the $I_2$ signal in AND gate 108, will produce an output which will pass through OR gate 110 and set $Y_1$ flip-flop 72.

If an $A_2$ sequence is in progress and producing a signal on line 46, and 01–03 Type I function code will produce a signal on line 116 which when combined with the $A_2$ signal on line 46, will cause AND gate 112 to produce an output which will pass through OR gate 110 and set $Y_1$ flip-flop 72.

Thus, it may be seen that the Y sequence can be entered from either the I or the A sequence. After $Y_1$ flip-flop 72 is set, it provides outputs not only on lines 120 and 122 but also provides inputs to AND gates 124 and 126 where, when main pulse 8 is applied on line 49, $Y_2$ flip-flop 72' is set. When flip-flop 72 is set, it produces an output on line 50 which, in conjunction with main pulse 10 on line 51 at AND gate 128, clears $Y_1$ flip-flop 72. Thus it can be seen that the Y sequence may be entered from either the I sequence or the A sequence depending upon the particular function code involved as shown in FIG. 4 and FIG. 22.

As can be seen in the Instruction Repertoire in FIG. 21 and in the Sequence Transfer Table shown in FIG. 22, the A sequence may be entered from either the I sequence or the Y sequence, depending upon the particular function code involved. Referring now to FIG. 4, it can be seen that if the $Y_2$ sequence is in progress and producing a signal on line 50 and if the proper function code is producing a signal on line 144, AND gate 130 will produce an output which passes through OR gate 132 and sets $A_1$ flip-flop 74. If the $I_2$ sequence is in progress and producing a signal on line 42 and if the proper function code as shown in FIG. 22 is being used to produce a signal on line 146, AND gate 134 will produce an output which will pass through OR gate 132 and set $A_1$ flip-flop 74. Thus, it can be seen that the A sequence may be entered from either the I or the Y sequence depending upon the particular function code involved. When $A_1$ flip-flop 74 is set, it produces outputs not only on lines 136 and 138 but also provides inputs to AND gates 140 and 142 where, when main pulse 8 on line 49 is also applied to AND gates 140 and 142, $A_2$ flip-flop 74' is set. When flip-flop 74' is set, one of its outputs on line 46 is applied to AND gate 148 where, in conjunction with the main pulse 10 on line 51, it clears $A_1$ flip-flop 74. The output of the $I_2$, $Y_2$ and $A_2$ flip-flops on lines 42, 50 and 46, respectively, are also used as previously explained to cause entry into the P sequence depending upon the proper function code as shown in the Instruction Repertoire in FIG. 21 and the Sequence Transfer Table in FIG. 22.

Thus, FIG. 4, in conjunction with FIGS. 21 and 22, shows how the various sequences are entered depending upon the particular function codes being utilized.

*Function code register*

Function code register 15 (F register) is used to produce Type I function codes from 00 to 07 and from 10 to 17 and to produce Type II function codes from 00 to 07 and from 10 to 17. As explained prevoiusly, the instruction word which is read out from the memory to the Z register may be of the Type I or Type II format. If it is of the Type I format, the upper 4 bits, Z14–Z17, are used to designate the particular function code to be used. If it is of the Type II format, the upper 8 bits or Z10–Z17 are used to indicate the particular function code to be used. Table III shows the relationship between the actual binary representations of the Type I and Type II octal codes as well as the binary representation embodied in the present circuirty to represent each of these functions. For Type I octal codes, it can be seen in column 2 that the last two bits of the binary representations are always 0 and, thus, in the actual circuitry used, ony 4 registers are required to represent the first four bits. In the binary representation of Type II octal codes, the last column of digits is always 0. Therefore, only the first 5 columns are used and 5 flip-flops are used to indicate the status of these columns. Thus, in the Type II format, digits 14–17 from the Z register will all contain 0's and will cause a fifth flip-flop, 174 in FIG. 5, to be set indicating that a Type II signal is being received.

Assuming that any Type I format function code is being received, FIG. 23 shows that at least one of bits Z14–Z17 will produce a binary "1" on at least one of lines 150, 152, 154 or 156 of FIGURE 5. The signals on lines 150, 152, 154 and 156 are all coupled to AND gate 166 where, since at least one of the signals will be a "1," AND gate 166 will present a "1" output which will pass through AND gate 168 if the signal representing the $I_1$ sequence is present on line 200 and a signal representing main pulse 7 is on line 202. The output from AND gate 166 will then be coupled to AND gates 176, 178, 180 and 182 which will allow the signals on input lines 156, 154, 152 and 150 respectively to set flip-flops 164, 162, 160 and 158, respectively. The "1" output from AND gate 166 also passes through inverter 170 to AND gate 172. However, since inverter 170 produces a "0" output, AND gate 172 will not produce an output and flip-flop 174 will not be set. Thus, flip-flops 158, 160, 162 and 164 will set depending upon the input information on lines 150, 152, 154 and 156 while flip-flop 174 will not set thus indicating that a Type I instruction is being received.

Assuming now that a Type II format function code is being received, it can be seen from column 3 of the table in FIG. 23 that bits 14–17 will each contain a "0." These "0's" on lines 150, 152, 154 and 156 in FIG. 5 will be coupled to AND gate 166 which will produce a "0" output. The "0" output cannot pass through AND gate 168. However, as it passes through inverter 170 which produces a "1" output which will pass through AND gate 172 if a signal representing the $I_1$ sequence is on line 200 and main pulse 7 is on line 202. The output from AND gate 172 will then set flip-flop 174 indicating that a Type II sequence is being received and at the same time will be coupled to AND gates 184, 186, 188 and 190 where they will be ANDed with the inputs on lines 192, 194, 196 and 198 respectively, to produce outputs which will set flip-flops 158, 160, 162 and 164. Thus if the Type II instruction is used, flip-flops 158, 160, 162 and 164 will store the information found in bits 10, 11, 12 and 13 from the Z register while flip-flop 174 will set indicating that a Type II format is being received because all "0's" were found in bits 14–17 from the Z register. AND gates 204, 206, 208, 210, 212, 214, 216 and 218 translate the binary information stored in flip-flops 158, 160 and 162 into an octal representation of the number in the first column of the octal code. Thus, if the function code used is "04" and a binary "4," or 100, is stored in flip-flops 162, 160 and 158 respectively, AND gates 204–218 will translate the 100 into a signal on the output of AND gate 212 representing a "4." If the binary information stored in each of the flip-flops 158, 160 and 162 is a "0" then there will be an output from AND gate 204 representing a "0." If flip-flops 158, 160 and 162 store a binary "7," or a 111, an output will be obtained from AND gate 218 indicating a "7."

Flip-flop 164 will store the binary representation of the number in the second column of the octal code which will be either a "1" or a "0." Thus, the ouput of flip-flop 164 will be either a 0X or 1X (where the X represents any number in the first column of the octal code). These outputs from flip-flop 164 are combined in AND gates 220, 222, 224 and 226 with the outputs of flip-flop 174 (which indicate whether the Type I or Type II format signal is being received) to produce output signals 0XI, 1XI, 0XII and 1XII.

Groups of AND gates 228, 230, 232 and 234 combine the outputs from AND gates 204, 206, 208, 210, 212, 214, 216 and 218 with the outputs from AND gates 220, 222, 224 and 226 to give a possible combination of 32 outputs. These outputs are in groups of 8 ranging from Type I, 00–07 and 10–17 and Type II, 00–07 and 10–17. It can be seen from FIG. 5 that the output of AND gate 220 is connected to all of the AND gates in group 234. The output of AND gate 222 is connected to all of the AND gates in group 232. The output of AND gate 224 is connected to all of the AND gates in group 230 and the output of AND gate 226 is connected to all of the AND gates in group 228. The output of the eight AND gates 204, 206, 208, 210, 212, 214, 216 and 218 are connected to the eight AND gates in each of the four groups. Thus, AND gate 236 in group 228 combines the 0XI output from AND gate 226 with the X7 output from AND gate 218 to obtain the 07I output from AND gate 236. Similarly, AND gate 238 in group 228 combines the output of AND gate 226, 0XI, with the output X0 of AND gate 204 to produce an output 00I from AND gate 238. The remainder of the AND gates in each of the groups 228, 230, 232, and 234 are connected in a similar manner with AND gates 240 and 242 in group 230, AND gates 244 and 246 in group 232 and AND gates 248 and 250 in group 234 shown connected for purposes of illustration. For simplicity, the remainder of the AND gates are not shown connected. Thus, it can be seen in FIG. 5 that bits 14–17 or bits 10–17 from the Z register which represent the function code are translated into a possible combination of 32 bits each of which of which illustrates an octal code and is used in various circuits in the computer.

Timing unit 23, sequencer 18 and function code register 14 constitute the control section of the computer which coordinates the flow of data between the arithmetic storage sections and governs the operations that take place during the sequential execution of the instructions. It will be remembered that the Program Address Register, more commonly known as the P register, is an integral part of the computer memory and contains the address of the instruction words located in the memory. Thus, during the P sequence the address of the instruction word is always read out of the P register in the memory to the Z register.

*Fixed address circuitry*

FIG. 6 shows the fixed address circuitry for forcing the computer to seek information from either the P or the A register in the memory and transfer it to the Z or memory buffer register. Whenever the Sequencer 18 is producing a $P_1$ sequence, a signal will appear on line 252 in FIG. 6 which will pass through OR gate 254 to AND gate 256, where, in conjunction with main pulse 1 on line 258, a signal will be produced which will set flip-flop 260. When flip-flop 260 is set, it will produce a signal on line 7 which will energize the appropriate drive lines to the computer memory to cause the information stored in the P register to be read out to the Z register. Flip-flop 260 will always be cleared by main pulse 15 on line 262.

The A sequence always forces the computer to read out the information stored in the Accumulator Register in the memory with one exception. This exception occurs during $A_1$ sequence with a function code instruction of 01I at which time the computer is required to read out the information stored in the P register of the memory. Thus as can be seen in FIG. 6, if the Function Code Register 14 is producing an X1 signal on line 266 and and 0XI signal on line 268, AND gate 270 will produce a signal which, when combined with the $A_1$ sequence signal on line 264, will cause AND gate 272 to produce a signal which will pass through OR gate 254 and set flip-flop 260 through AND gate 256 when main pulse 1 appears on line 258. It can readily be seen that when AND gate 270 produces a signal which will set flip-flop 260 thus selecting the P register, the same signal from AND gate 270 is connected to inverter 274 which will therefore produce a "0" output. AND gate 276 will thus be inhibited and will not produce an output. However, when Function Code Register 14 is not applying an X1 signal to line 266 or an 0XI signal to line 268, AND gate 270 will not have an output, and thus, inverter 274 will produce a "1" output which will enable AND gate 276 whenever an $A_1$ sequence signal appears on line 264. Thus it will be seen that flip-flop 280 will be set by AND gate 278 whenever main pulse 1 appears on line 258 and AND gate 276 has an output. It can be seen then that AND gate 276 will have an output whenever an $A_1$ sequence signal appears on line 264 and there is no X1 and 0XI signals applied to AND gate 270. Summarizing the Fixed Address Circuitry shown in FIG. 6 then, it can be seen that the P sequence will always force flip-flop 260 to energize proper drive lines to select the P register in the memory. It can be also seen that the $A_1$ sequence signal will always cause flip-flop 280 to set and energize

13 the proper drive lines to select the Accumulator Register in the memory except when Function Code 14 applies signals X1 and 0X1 to AND gate 270. At that time the flip-flop 260 will be set thus selecting the P register instead of the Accumulator register.

Z register

FIG. 7 discloses a schematic of Z register 8. Z register 8 receives not only information from the Programmed Address Register, the Accumulator register and the main body of the memory but it also receives signals from input amplifiers if input/output operations are to be performed. Z register 8 contains a group 282 of 17 flip-flops. However, for the sake of simplicity only 4 have been shown in FIG. 7. All signals read out of memory 2 are presented to Z register 8 on lines 284. During some instructions it may be necessary to transfer information from the memory to only the upper 4 bits of Z register 8. At other times it may be necessary to transfer information from the memory to all 17 registers of Z reigster 8. Therefore, control signals on line 302 and 304 determine which section or sections of the Z register will be receiving information from the memory 8. AND gates 294, 296, 298 and 300, when presented with a signal from memory 2 and with a control signal on either line 302 or 304, produce signals which pass through OR gates 306, 308, 310 and 312 thus setting the appropriate registers in A register 8. Further, it is at times necessary to clear all 17 flip-flops of the Z register. However, at times it may be necessary to clear only the upper 4 bits or flip-flops of the Z register. Therefore, signals on lines 288 or 290 will determine whether all or only part of the flip-flops of Z register 8 are cleared at the appropriate time.

Input amplifiers to Z register

If input operations are to be performed, signals from the input amplifiers will appear on lines 286 and fed to AND gates 316, 318, 320 and 322. When the appropriate control signal appears on line 292 which is fed to AND gates 316–322, each of the AND gates will produce an output signal which pass through OR gates 306, 308, 310 and 312 thus setting all flip-flops of Z register 8 according to the signals presented on input lines from the input amplifiers.

Thus FIG. 7 is a schematic of the Z register showing the gates which control the transfer of signals from the memory to the upper and/or lower flip-flops of the Z register as well as gates which control the clearing of the upper and lower flip-flops of the Z register.

Z register control

The circuitry for determining when the information in the memory will be transferred to the upper flip-flops of the Z register or the lower flip-flops of the Z register is shown in FIG. 8. If Run flip-flop 34 in sequencer 18 is set, a signal will appear on line 336 in FIG. 8. AND gate 340 will produce an output signal when main pulse 3 appears on line 338. The output from AND gate 340 will set flip-flop 324 which will produce a strobe pulse which is sent to AND gates 326 and 328. The outputs from AND gates 326 and 328 will always cause the memory signals to be transferred to the flip-flops of the Z register unless inhibit pulses appear on lines 330, 332 and 334.

Memory to $Z_{14\text{-}17}$ inhibited

The input signal on line 330 will be produced by AND gate 342 whenever Sequencer 18 is producing a $Y_1$ sequence and causing a signal on line 344 and Function Code Register 14 is producing an 03I signal on line 346. Referring to the Instruction Repertoire Table I it will be seen that code 03I is associated with the instruction "store A." To perform this instruction the data in the Accumulator Register 6 must be removed and transferred to a specific location in memory Y. To perform this op-

14 eration, sequences P, I, A and Y are required. During the P sequence the address of the instruction word is obtained. During the I sequence the instruction word itself is obtained which contains the address of the operand which in this case is the data in the Accumulator Register. Therefore, during the A sequence the information in the accumulator register is read out to the Z register. It is necessary at this time to take the information in the Z register and restore it to a particular location in the Y section of the memory. Therefore, it is not desired that the memory should transfer any information to the Z reigster during the Y sequence of this instruction. Returning to FIG. 8 it will be noted then that the upper 4 bits of the Z register will be inhibited during the occurrence of a $Y_1$ sequence, 03I function code.

Memory to $Z_{0\text{-}13}$ inhibited

The lower 13 bits of the Z register will also be inhibited at this time by the $Y_1$ signal on line 364 and the 03I function code signal on line 366, both of which will cause an output from AND gate 362 on line 34 which will inhibit the output signal from line 328.

Memory to $Z_{0\text{-}17}$ inhibited

Similarly, function codes 12 or 13I on lines 352 and $A_1$ sequence signal on lines 350 will cause an output from AND gates 348 which will pass through OR gate 354 thus inhibiting AND gate 326 and preventing the output. Also if a Jump signal is present on line 360 and a $P_1$ sequence signal is present on line 358, AND gate 356 will provide an output which will pass through OR gate 354 on line 332 thus inhibiting AND gates 326 and 328 and preventing an output. FIG. 8 then shows the circuitry which will inhibit or prevent a transfer of the information from the memory to the flip-flops of the Z register depending upon the sequence in progress and the function code being utilized.

Clear Z register

The flip-flops of the Z register must be cleared from time to time and it may be necessary, as previously explained, to clear only the upper four flip-flops of the Z register or it may be necessary to clear all 17 flip-flops in the Z register. Circuitry necessary to perform these functions is shown in FIG. 9. As can be seen from FIG. 9, OR gate 368 is connected to OR gate 370, AND gate 372 is connected to OR gate 374 and AND gate 376 is connected to both OR gates 370 and 374.

Clear $Z_{0\text{-}13}$

OR gate 368 will always produce a signal which will pass through OR gate 370 to clear the lower flip-flops 0–13 of the Z register except on two occasions when inhibit signals will be produced. The first inhibit signal is caused by a Jump signal on line 378 as well as main pulse 1 on line 380 which cause AND gate 382 to produce an output which passes through OR gate 368 as an inhibit signal to OR gate 370 thus preventing the clearing of the lower flip-flops of the Z register. The second inhibit signal is produced by a $Y_1$ sequence signal on line 384 as well as main pulse 1 signal on line 380 and the signals on line 386 caused by any one of the function codes 01–03I. A combination of these three signals cause an output from AND gate 388 which passes through OR gate 368 as an inhibit signal to OR gate 370 thus preventing the clearing of the lower flip-flops 0–13 of the Z register.

Clear $Z_{14-17}$

Similarly, the upper flip-flop 14–17 of the Z register will always be cleared during the application of main pulse 1 to AND gate 372 with one exception, and at the occurrence of this exception, the clearing of these flip-flops will be inhibited. This inhibit signal is produced during the $Y_1$ sequence and with a function code 03I. If the $Y_1$ sequence signal is applied to line 384 and an 03I function code signal is applied to line 390, AND gate 372 will produce an output when main pulse 1 is applied to line 380. The output of AND gate 372 will then be an inhibit signal to OR gate 364 which will prevent the clearing of the upper flip-flops 14–17 in the Z register.

*Clear $Z_{0-17}$*

It will be noted that the upper and lower flip-flops of the Z register will always be either cleared or inhibited when main pulse 1 is applied to the circuit. However, there are special circumstances under which both the upper and lower flip-flops of the Z register should be simultaneously cleared. This occurs at another point in time, namely during the application of main pulse 8 to line 396 in the circuit shown in FIG. 9. Thus during the A1 sequence and the presence of function codes 06I or 11 or 12II and the application of main pulse 8, both the upper and lower flip-flops of the Z register should be cleared. As shown in FIG. 9 if a signal due to the A1 sequence is applied to line 392 and a signal due to any of the function codes 06I, 11 or 12II is applied to line 394, AND gate 376 will produce a signal on its output when main pulse 8 is applied to line 396 which is coupled to both OR gates 370 and 374 thus causing both the upper and lower flip-flops of the Z register to be cleared.

Thus FIG. 9 has shown the circuitry necessary for controlling the clearing of the upper and/or lower flip-flops of the Z register.

*S Register*

It will be remembered that the P sequence always transfers a programmed address word from the memory to the Z register and from the Z register to the S register. It will also be remembered that during the I sequence the instruction word is transferred from the memory to the Z register and the lower 14 bits of the Z register are transferred to the S register. FIG. 10 shows the schematic of S register 10 with only 4 of the 14 flip-flops 398 shown for purposes of simplicity. It will be seen that the AND gates 408, 410, 412 and 414 are connected to the lower 14 bits of the Z register through lines 400, 402, 404 and 406. The control signal necessary for causing a transfer of the information from the lower 14 flip-flops of the Z register to the corresponding flip-flops of the S register appears on line 416 and is coupled to all of the AND gates 408, 410, 412 and 414 thus causing these AND gates to produce signals which set the appropriate flip-flops of the S register depending upon the information appearing on lines 400, 402, 404 and 406 from the Z register. On one occasion it is necessary to set the first two bits of the S register in order that the next sequence will cause a particular address to be read out of the memory. When these special circumstances occur, a signal will appear on line 420, which will pass through AND gates 416 and 418 through OR gates 422 and 424 to set flip-flops 0 and 1. When it is necessary to clear the S register, a signal appears on line 426 which is coupled to gate 428, 430, 432 and 434 in which simultaneously clears all flip-flops of the S register. Thus, FIG. 10 is a schematic of the S register showing the gates which control the transfer of information from the lower 14 flip-flops of the Z register to the corresponding flip-flops of the S register as well as circuitry for setting only the first two flip-flops of the S register on a special occasion. Also shown are the gates which control the clearing of the S register.

*S register control*

FIG. 11 shows the control circuitry for the S register. It will be remembered that it is during either the P or the I sequence that the S register stores information from the Z register. Therefore, when a signal appears on line 436 indicating the $P_2$ sequence is in progress or if a signal appears on line 438 indicating the $I_2$ sequence is in progress, both OR gates 440 and 446 will produce outputs.

*Clear S*

AND gate 442 will produce an output which will clear all stages of the S register if a signal is present from the output of OR gate 440 and if main pulse 15 is present on line 444.

*Transfer Z to S*

When the next clock pulse, main pulse 16, appears on line 450, AND gate 448 will produce an output causing the information in the Z register to transfer to the S register. This signal will occur because OR gate 446 will have an output and main pulse 16 will appear on line 450.

*Set $S_{1,2}$*

The special situation in which the first two bits of the S register must be set occurs during the Y sequence and an 01I function code. Thus if a $Y_2$ sequence signal appears on line 454 and an 01I function code signal appears on line 452, AND gate 456 will produce an output which will cause AND gate 458 to set the first two flip-flops of the S register when main pulse 16 appears on line 450. Thus, FIG. 11 discloses the circuitry which provides the necessary control signals to regulate the gates on the S register which allow information to be transferred to the S register flip-flops.

*X register*

FIG. 12 discloses a schematic of X register 12 which includes 18 flip-flops 460, only three of which have been shown for purposes of simplicity in the illustration. It will be noticed in FIG. 12 that the information stored in the Z register flip-flops may be transferred to the X register flip-flop in four different ways according to the control signals on line 462, 464, 466, and 468. First, the information in the Z register flip-flop may be shifted left six places and the result transferred to the X register. Second, the information stored in the Z register flip-flop may be transferred directly to corresponding flip-flops in the X register. Third, the information stored in the Z register flip-flop may be complemented and transferred to the corresponding flip-flops in the X register. Fourth, the information stored in the Z register flip-flop may be shifted right one place and the result transferred to the flip-flops of the X register.

*Z to X left 6*

It will thus be seen that when it is desired to shift the information stored in the Z register flip-flop six places to the left and transfer them to the X register, a signal will appear on line 462. This signal will enable AND gates, 470, 472 and 474 enabling the signals in the appropriate Z registers connected to the respective flip-flops to pass through OR gate 476, 478 and 480 thus storing the information from the Z register flip-flops in the X register flip-flops. It will be noted that flip-flop 12 of the Z register is connected to flip-flop 0 of the X register. Likewise flip-flop 3 of the Z register is connected to flip-flop 9 of the X register. Similarly, flip-flop 11 of the Z register is connected to flip-flop 17 of the X register. Thus it is seen that the information stored in the Z register is shifted 6 bits or places to the left prior to its being stored in the appropriate flip-flops of the X register.

*Z directly to X*

If it is desired to transfer the information stored in the flip-flop of the Z register directly to corresponding flip-flops of the X register, a signal will appear on line 464 which will enable AND gates 482, 484 and 486 thus allowing the information from the A register on lines 488, 490 and 492 to pass through OR gates 476, 478 and 480 respectively thus setting the appropriate flip-flops of the X register.

*Z complemented to X*

If it is desired to transfer the complement of the information stored in the flip-flops of the Z register to corresponding flip-flops of the X register, a signal will appear on line 466 which will enable AND gates 494, 496 and 498, thus allowing the signals from the complementary side of the Z register flip-flops appearing on lines 500, 502 and 504 to pass through OR gates 476, 478 and 480 respectively thus setting the complement of the Z register flip-flops in the appropriate flip-flops of the X register.

Z to X right 1

If it is desired to shift the information stored in the Z register flip-flop one place to the right and transfer the result to the appropriate flip-flops in the X register, a signal will appear on line 468 which will enable AND gates 506, 508 and 510 thus allowing the signals from the Z register appearing on lines 512, 514 and 516 to pass through OR gates 476, 478 and 480, respectively, to set the appropriate flip-flops in the X register. It will be noted that signals from the number 1 flip-flop of the Z register are connected to the number 0 flip-flop of the X register, that the output from number 10 flip-flop of the Z register is coupled to number 9 flip-flop of the X register and that the output of number 0 flip-flop of the Z register is coupled to number 17 flip-flop of the X register. Thus. it can be seen that the bits stored in the Z register have been shifted one place to the right and then transferred to the appropriate flip-flop of the X register.

While for purposes of simplicity it has not been shown in FIG. 12, line 464 (which causes transfer of the information stored in the Z register flip-flops directly to the X register flip-flops) actually consists of four lines, one of which is coupled to X register flip-flops 0–5, a second of which is coupled to X register flip-flops 6–9, the third of which is coupled to flip-flops 10–13 and the fourth of which is coupled to flip-flops 14–17. As will be seen in the discussion of FIG. 13, the X register control circuits, this arrangement enables various ones of the Z register flip-flops to transfer their information to particular flip-flops of the X register. Similarly, line 466 in FIG. 12 (which enables the complement of the flip-flops in the Z register to be transferred directly to the corresponding flip-flops of the X register) actually comprises two lines, one of which enables X register flip-flops 0–13 and the other of which enables flip-flops 14–17. Again, this situation exists to enable all or a part of the information stored in the Z register flip-flops to be transferred to the corresponding X register flip-flops.

Clear X register

As also can be seen in FIG. 12, when it is desired to clear the X register, a signal appears on line 518 which is coupled to gates 520, 522 and 524 the output of each of which clears one of the X register flip-flops. Thus all flip-flops of the X register are cleared simultaneously.

X register control circuitry

Consider now the control circuits for the X register as shown in FIG. 13.

Z to X left 6

The output of AND gate 526 will ENABLE the appropriate input gates to the X register to allow the information from the Z register to be shifted left six places and transferred into the X register flip-flops. AND gate 526 will provide an output if there is a signal representing main pulse 7 on line 530, a signal indicating the $A_1$ sequence is in progress on line 532 and a signal on line 534 indicating function code 11II is being executed.

Z to X right 1

Also the output of AND gate 528 will enable the appropriate AND gate on the input to the X register flip-flops to enable the information in the Z register to be shifted right one place and transferred into the appropriate X register flip-flops. To produce this signal AND gates 528 must have as inputs a signal representing main pulse 7 on line 530, a signal representing the $A_1$ sequence on line 532 and a signal on line 536 representing function code 12II.

Set X

As stated previously, the information in the flip-flops of the Z register may be transmitted directly to the flip-flops of the X register. This is denoted in FIG. 13 as Z' to X'. It was also stated previously that the information in the Z register flip-flops may be complemented and transferred to the X register flip-flop. This is noted in FIG. 13 as Z to X'. In many of the instruction sequences it is necessary to set all the flip-flops of the X register to the same state. This is accomplished by the circuitry in FIG. 13 by transmitting both a Z' to X' signal and a Z to X' signal simultaneously. In other words by transferring the information in the Z register flip-flops directly to the X register flip-flops and simultaneosuly transferring the complement of the information in the Z register flip-flops to the X register flip-flops, all of the X register flip-flops are set to the "0" state. Therefore, to set the X register flip-flops, OR gates 544, 546, 548, 550, 552 and 554 must have outputs simultaneously. AND gate 538 is directly connected to OR gates 544–554 and will cause them to have outputs simultaneously, if it has inputs main pulse 16 on line 540 and the output from OR gate 542. There are several conditions which will cause an output from OR gate 542. The first condition will occur if appropriate input/output control circuitry (not described in this specification but completely disclosed and described in application No. 143,425, filed Apr. 13, 1961, and assigned to the assignee of this application) produces a signal on line 556. This essentially indicates that an Output Data Request signal has been received and the X register must be set prior to storing the output data in it. The X register must also be set during the $I_1$ and $P_1$ sequences which produce signals on line 558 and 560 respectively either of which causes an output from OR gate 542. If the $Y_1$ sequence is in progress and producing a signal on line 562 and function code 11 or 12I is being used and producing a signal on line 564, AND gate 566 will produce an output which will cause OR gate 542 to produce an output which will set the X register as previously described. OR gate 570 have an output if either function code 04II produces a signal on line 567 or any of the function codes 01–03I produce a signal on line 568. This output from OR gate 570 will cause AND gate 572 to produce an output if the $A_1$ sequence is in progress and producing a signal on line 532. The output of AND gate 572 will then pass through OR gate 542 thus setting the X register as previously described.

Z' directly to X'

During the execution of function code 12I, the operand of the instruction word, bits 0–13, is transferred into bits 0–13 of the accumulator.

$Z'_{14}$ to $X'_{14-17}$

Bit 14 of the operand is the sign bit and is extended to fill bits 14–17 of the Accumulator. Therefore, if the $A_1$ sequence is in progress, a signal will be produced on line 532 to AND gate 574. If the function 12I is being used, a signal will be present on line 574 to AND gate 576. These two inputs will cause AND gate 576 to have an output on line 578, which passes through the inverter 580 to AND gate 582. If a "0" is stored in bit 14 in the Z register, a signal will be present on line 584 to AND gate 582 which will cause an output from AND gate 582 on line 586. This output is connected to both OR gates 544 and 552 whose outputs cause flip-flops 14–17 of the X register to be set or "0's" to be stored therein.

$Z_{0-13}$ to $X_{0-13}$

A signal from the output of AND gate 576 on line 578 will also be coupled to OR gates 546, 548 and 550 thus causing the information stored in flip-flops 0–13 of the Z register to be transferred to flip-flops 0–13 of the X register.

$Z_{0-17}$ to $X_{0-17}$

If either of the AND gates 588, 590 or 592 have outputs, the information stored in all 18 flip-flops of the Z register will be transferred directly to corresponding flip-flops of the X register. AND gate 588 will have an output if the $A_1$ sequence is in progress and thus providing a signal on line 532 along with main pulse 7 on line 530 and function code 06I on line 594. AND gate 590 will have an output when the $A_1$ sequence is in progress and producing a signal on line 532 along with main pulse 16 on line 540 and any of function code signals 04, 06, 07 or 13I producing a signal on line 596. AND gate 592 will produce an output if the A1 sequence is in progress and producing a signal on line 532 along with main pulse 7 on line 530 and a signal from the input/output control circuitry on line 556.

$Z_{0-17}$ to $X'_{0-17}$

During the execution of the function code 05I which is the subtract function code it is necessary to transfer the complement of the information stored by the Z register flip-flops to the corresponding X register flip-flops. Therefore, AND gate 598 will produce an output if it has as inputs main pulse 16 on line 540, an $A_1$ sequence signal on line 532 and 05I function code signal on line 600. The output of AND gate 598 will then pass through OR gates 552 and 554 which will then cause the transfer of the complement of the information stored by the flip-flops in the Z register to the corresponding flip-flops of the X register.

*Clear X*

The X register may also be cleared by applying main pulse 15 to line 604 which will cause AND gate 602 to have an output thus clearing the X register flip-flops.

*Summary of X register*

Thus FIG. 12 shows the X register with the necessary gates and input signals to cause the information in the Z flip-flops either to be shifted left 6 places and transferred to the corresponding flip-flops of the X register, cause the information in the Z register flip-flop ot be transferred directly to corresponding flip-flops in the X register, cause the information in the Z register flip-flops to be complemented and transferred to corresponding X register flip-flops or cause the information in the Z register flip-flops to be shifted right one place and then transferred to the X register flip-flops. Finally, it may have as an input a clear X signal which will cause all of the flip-flops of the X register to be cleared.

*Summary of X-register control circuitry*

FIG. 13 shows the control circuits necessary to produce the input signals to the X register in FIG. 12 which will cause the aforementioned functions and information transfer to take place.

*Adder generally*

As explained previously, one of the advantages to the present computer is the fact that the inputs to the adder come directly from the X and Z registers and, thus there are no extra elements necessary such as registers for buffering the signals from the X and Z registers. Another of the advantages already explained is that the output of the adder is directly connected to the memory circuit for restoring data therein without need for using buffering registers.

The operation of the adder in FIG. 14 can best be understood by considering that each individual stage thereof is composed of three main parts. As will be explained more fully hereinbelow, the first portions of each stage combines the input signals directly from the X and Z registers thereto in such a way that the logical sum of the input signals, i.e., the sum neglecting carries from the lower order stage, is formed at its output. This signal representing the logical sum appears at the output of NOT circuits 636, 682 and so forth. A second portion of each stage examines the input signal as well as any carry signals which may or may not be propagated from an adjacent lower order stage and forms a carry signal which is passed on the adjacent higher order stage provided the proper conditions exist. The carry signal generating circuitry includes two AND circuits 650 and 662, the NOR circuit 664 and the NOT circuit 668. The third portion of each stage combines the logical sum of the input signals developed in that stage with the carry signals transmitted from the lower order stage to produce a signal representing the true sum of the input signals and the carry. In the circuit of FIG. 14 the signal representing the true sum appears at the output of NOR circuit 660 and the equivalent NOR circuit in each of the succeeding stages.

Thus each of the adder circuits in stages 606, 608, 610 and 612 are known as full adders since they combine the logical sum of the two input signals with any carry signal formed in a preceding stage to provide a sum and carry output. However, in the present computer it is sometimes necessary to utilize adder 16 as a half adder thus providing as outputs of each stage the logical sum of the two input signals without combining that sum with the carry signals of the preceding stages. Therefore, provision is made in the instant case to provide a signal on line 658 when it is desired that a half add only should be used. This signal will inhibit various elements in each of the respective stages in the adder. In stage 0 shown in dashed outline 606 the signal inhibits AND gate 646, NOT gate 656 and NOT gate 668. In stage 1 shown enclosed by dashed lines 608 it is necessary only to inhibit AND gate 680 since the carry signal from the preceding stage was already inhibited at NOT gate 668. Stage 2 shown enclosed by dashed line 610 has the same elements inhibited as stage 0 and, similarly, stage 3 shown enclosed by dashed line 612 has elements inhibited in it exactly the same as those inhibited in stage 1.

*Full adder*

Referring specifically to stage 0 by using conventional notation of Boolean algebra, it can be seen that the signal appearing at the output of AND circuit 616 may be represented as $\bar{X}_0 Z_0$. Similarly the signal appearing at the output of AND circuit 618 may be represented by the expression $X_0 \bar{Z}_0$. Since these signals are applied to NOR circuit 632, the signal appearing on conductors 634 and 638 may be represented by the Boolean expression $\overline{\bar{X}_0 Z_0 + X_0 \bar{Z}_0}$. This expression is the complement of the logical sum and will be represented herein by the symbol $\bar{S}'$. This signal being applied to inverter 636 causes the inverse or the logical sum $S'_0$ to appear at the junction 642.

The truth table of FIG. 15a illustrates the condition of the output signal from NOT circuit 636 for the four possible combinations of input signals. This truth table is identical to that for the the well known exclusive OR logic circuit and hence a combination of the AND circuits 616 and 618, the NOR circuit 632 and the NOT circuit 636 can be considered as an exclusive OR logic block.

FIG. 15b is a truth table illustrating the various combinations of input signals which cause a carry signal to be generated. It can be seen that only when the input signals are both logical "1" signals will a carry signal be generated. Whether or not the carry signal will be propagated to an adjacent higher order stage is also dependent upon whether or not a carry signal from an adjacent lower order stage can be absorbed in the stage in question. The truth table of FIG. 15c shows there are two conditions upon which a carry signal entering a stage from the next lower order stage should be propagated into the next higher order stage. Those conditions occur when the input signal from the Z and X registers are not alike. It should be noted that the truth table of the logical sum illustrated in FIG. 15a is identical to that of FIG. 15c.

The function of AND circuit 662 is to examine the complement of the input signals $X_0Z_0$ to determine whether or not a carry signal should be generated and passed on to stage 1. If the first stage of the X register and the first stage 1 of the Z register are both in the "1" state, the complement of each of the stages, $\overline{X}_1$ and $\overline{Z}_1$ will be the "0" state and the output from AND circuit 662 will be a logical "0" signal. Provided that AND circuit 650 is also outputting a logical "0" signal, the output from NOR circuit 664 appearing at junction 666 will be a logical "1" signal indicating that a carry signal is generated for propagation to adder stage number 1. Under the assumed conditions, i.e., the first stage of the X and Z registers both contain a "1" signal, the output from the exclusive OR circuit mentioned previously will be a "0" thereby ensuring that the output from AND circuit 650 will also be a "0." If the input to AND circuit 662 is any of the other combinations illustrated in the truth table of FIG. 15b, a carry signal will not be generated in the stage 0. This is not to say however, that a carry signal will not appear on conductor 670 and be applied to stage 1 because it is possible that a carry signal from the lower order stage cannot be satisfied in stage 0 and must be propagated further up the line. The truth table of FIG. 15c illustrates the conditions under which the carry generating circuit of stage 0 will be enabled to permit propagation of a carry signal on line 654 to stage 1. As mentioned previously, the logical sum signal S' is also used as the carry enable signal. As shown in FIG. 14 the output from NOT circuit 636, which is the logical sum signal, is applied by way of conductor 648 to a first input terminal of AND circuit 650 to thereby serve as a carry enable signal. Provided that no carry signal is present on line 654, the signal appearing on conductor 652 will be a logical "1." Therefore, the output from AND circuit 650 will also be a "1" signal causing NOR circuit 664 to output a logical "0" indicating that no carry signal is to be propagated to stage 1. Had a carry signal been present on line 654, AND circuit 650 would have produced a "0" signal at its output causing NOR circuit 664 to generate a "1" signal at junction 666 indicating a carry signal is to be passed on to stage 1.

The AND circuit 646 combines any carry signal which may be present on conductor 654 with the logical sum signal $S'_0$ of stage 0 to form a signal at its output which may be represented by the expression $S'_0C_{IN}$. In a similar manner the AND circuit 640 combines the complement of the carry signal on conductor 652 with the complement of the logical sum of stage 0 to form a signal which may be represented by the expression $\overline{S_0'}\overline{C_{IN}}$. Therefore the output from NOR circuit 660 may be expressed by the equation $S_0'C_{IN}+\overline{S}_0'\overline{C}_{IN}$. By using Boolean algebra it can be shown that this expression is identical to the one resulting from the application of these signals to an exclusive OR circuit.

Referring now to stage 1 of the adder circuit of FIG. 14 which is shown as being enclosed by the dashed box 608, it can be seen that this stage is quite similar to stage 0 discussed above. However, there are two differences involved. First of all, rather than combining the logical sum signal $S_1'$ with the carry signal $C_0$ in the AND circuit 672 as was done by AND circuit 646 in stage 0, in stage 1, the complement of the logical sum signal $\overline{S'}_1$ is combined with $\overline{C}_0$, the complement of the carry signal $C_0$, by AND circuit 672. More specifically, the output of NOR circuit 674 is applied by way of conductor 678 to a first input of AND circuit 672 and the output from NOT circuit 668 in stage 0 is applied to the second input of this same AND circuit. Since the signal appearing at junction 666 was defined as the carry signal $C_0$, the signal appearing at the output of NOR circuit 668 is the complement of the carry signal or $\overline{C}_0$. In stage 1, the logical sum signal $S_1'$ appearing at the output of NOT circuit 682 is applied by way of conductor 684 to the first input terminal of AND circuit 680 where it is logically combined with the carry signal, $C_0$, from stage 0. It may be recalled that in stage 0, this ANDing function was performed by circuit 646.

The second difference between stage 0 and stage 1 lies in the manner in which the inputs are connected to AND circuit 676 of the carry generating network of stage 1. Whereas in stage 0 the AND circuit 662 receives the complement inputs from the first stage of the X and Z registers, in stage 1 AND circuit 676 receives the direct signals from the second stage of the X and Z registers, i.e., the signals $X_1$ and $Z_1$. Also in stage $0_1$ the AND circuit 650 receives the NOT carry signal $\overline{C}_{IN}$ whereas the AND circuit 686 receives the carry signal $C_0$. As a result, the signal appearing at the output of NOR circuit 688 may be expressed by the Boolean expression $\overline{C_0S_1'+X_1Z_1}$ whereas the signal appearing at the output of the NOR circuit 664 is expressed by $\overline{\overline{X}_0\overline{Z}_0+C_{IN}\overline{S}_0'}$. By manipulating these expressions according to the rules of Boolean algebra or by developing a truth table for the various possible combinations of X, Y and C it can be shown that the expression for the signal appearing at the output of NOR circuit 688 is the complement of the expression for the signal appearing at the output of NOR circuit 664.

The carry generating of stage 2 is identical to that of stage 0 except for the fact that the inputs to AND circuit 690 come from the third stage of the X and Z register. On the other hand, the carry generating network for stage 3 is identical to that of stage 1, the AND circuit 692 receiving the direct inputs from the fourth stage of the X and Z registers. The output of NOR circuit 694 may be connected to conductor 652 of adder stage 0 to provide for the propagation of an END AROUND carry. Similarly the signal appearing at the output of NOT circuit 698 may be connected to conductor 654 of stage 0 for the same reason. Of course, when more than four stages are employed in a group as will be the case generally it is the output from the carry generating network of the final stage in the group that is connected back to the initial stage. As used in the present invention, however, there is no end around carry and the carry signal out of the last stage is merely used to show that a carry has passed the last stage.

*Half-adder*

As was stated previously the adder may function as either a full adder or a half-adder. The description given above relates to the operation of the adder as a full adder. If it is necessary that the adder should operate as a half-adder, a half-add signal is applied to line 658. This half-add signal is coupled to AND gate 646, NOT gate 668 and NOT gate 656 in stage 0, to AND gate 680 in stage 1 to AND gate 702, NOT gate 704 and NOT gate 706 in stage 2 and AND gate 708 in stage 3. The purpose of the half-add signal is to nullify the effect of any carry signal which may be on the carry lines in any stage. In other words, the half-add signal makes all carry lines look as if they were carrying a "0" or NO carry. Thus if, normally, the "0" or NO carry were found on line 654, $C_{IN}$, AND gate 646 would always output a "0" regardless of the logical sum output from NOT gate 636, since either a "1" or a "0" ANDed with a "0" produces a "0."

Thus, when a half-add is desired, the half-add signal on line 658 which is applied to AND gate 646 inhibits AND gate 646 causing it to always output a "0." Also if a "0" or NO carry signal were applied on line 654 to NOT gate 656, the output of NOT gate 656 would be a "1." Therefore, when a half-add is necessary, the signal on line 658 inhibits NOT gate 656 or applies a ground to the input thus causing the output to always be a "1." Similarly, the output of NOT gate 668 represents a NOT carry and would always indicate a "1" if a carry were indicated by a "0." Therefore, when a half-add is required, the signal on line 658 provides a ground to one input of NOT circuit 668 thus causing it to always output a "1" as long as the half-add signal is applied. In stage 1 AND gate 680 is inhibited similarly to AND gate 646 in stage 0. In stage 2 AND gate 702 is inhibited in a similar manner to AND gate 646 in stage 0 and NOT gates 704 and 706 are inhibited similarly to NOT gates 656 and 668 in stage 0. In stage 3 AND gate 708 is inhibited similarly to AND gate 680 in stage 1.

Thus it has been shown that adder 16 will provide either full add or half add output depending upon the control signal which is applied to line 658.

Carry circuitry

FIG. 16 shows the circuitry necessary for producing the carry input and the NOT carry input to adder 16 on lines 654 and 652, respectively. A $C_{IN}$ pulse will be produced on line 654 whenever flip-flop 710 is set. Flip-flop 710 will be set when a pulse is present on line 712. AND gate 714 will produce a pulse on line 712 whenever main pulse 1 from the clock appears on line 716 and OR gate 718 has an output on line 720. OR gate 718 will produce a pulse on line 720 whenever either of lines 722, 724 and 726, all inputs to OR gate 718, is energized, a pulse will be present on line 722 whenever sequencer 18 is in the $P_1$ sequence. A pulse will be present on line 724 from AND gate 728 whenever Sequencer 18 is in the $Y_1$ sequence and producing a pulse on line 732 and simultaneously, the Function Code Register is producing the 10I function code signal on line 730. AND gate 733 will produce a pulse on line 726 whenever it has as inputs a pulse 734 which indicates that Sequencer 18 is in the $A_1$ sequence and a pulse is present on line 736 which indicates that Function Code Register 14 is producing an 05I function code signal. Thus it can be seen that the circuit in FIG. 16 will cause a carry to be transmitted to the adder under three conditions if main pulse 1 is present. The first condition is that the Squencer 18 must be in the $P_1$ sequence. This means that any time the Sequencer 18 is in the $P_1$ sequence and main pulse 1 is present on line 716 to AND gate 714, flip-flop 710 will be set and produce a carry signal. The second condition occurs when Sequencer 18 is in the $A_1$ sequence and the Function Code Register is producing an 05I code signal. This means that whenever these two conditions exist simultaneously and main pulse 1 appears on line 716, flip-flop 710 will be set and thus produce a carry. The third condition occurs when Sequencer 18 is in the $Y_1$ sequence and Function Code Register 14 is producing a 10I function code signal on line 730. This means that whenever these two conditions simultaneously exist and main pulse 1 appears on line 716, flip-flop 710 will be set by AND gate 714 and a carry will be produced. During any one instruction sequence, flip-flop 712 will always be cleared with the application of main pulse 15 on line 738.

Half-add control

FIG. 17 discloses the circuitry necessary to produce a half-add signal to be transmitted to adder 16 shown in FIG. 14 on line 658. Flip-flop 740 will produce a half-add signal, which is actually a ground, on line 658 whenever it is set by a signal on line 742 from AND gate 744. AND gate 744 will produce a signal on line 742 whenever main pulse 1 appears on line 746 and an output from OR gate 750 appears on line 748. OR gate 750 will produce an output on line 748 under four conditions. The first is the simultaneous occurrence of the $A_1$ sequence and function code 07I. The second is the simultaneous occurrence of $A_1$ sequence and function code 11II. The third is the simultaneous application of $A_1$ sequence and function code 12II. The fourth condition results from a signal from an input/output unit which has not been shown or disclosed since they are well known in the art and are not intended to be a part of this invention. Thus, AND gate 752 will produce an output on line 754 to OR gate 750 whenever it has as inputs a signal on line 758 representing function code 07I and a signal on line 756 representing the $A_1$ sequence. AND gate 760 will produce an output on line 762 to OR gate 750 whenever it has as inputs a signal representing the $A_1$ sequence on line 756 and an output from OR gate 764 on line 766. OR gate 764 will produce an output on line 766 to AND gate 760 whenever it has as inputs either a signal on line 678 representing 11II function code or a signal on line 770 representing 12II function code. The signal from the input/output unit appears on line 772 and is coupled to OR gate 750. Thus FIG. 17 discloses that there will be a half-add signal produced and sent to adder 16 to cause a half-add to take place whenever main pulse 1 occurs simultaneously with (1) a signal from an input/output unit, (2) a simultaneous application of the $A_1$ sequence and function code 07I, (3) a simultaneous application of $A_1$ sequence and function code 11II, and (4) a simultaneous application of $A_1$ sequence and function code 12II.

Jump instruction control

It is always necessary in any computer to be able to jump from one instruction to another either conditionally or unconditionally. Thus if the instruction word contains a function code indicating an unconditional jump, the computer will immediately jump to the next instruction word as determined by the address of the instruction word containing a jump signal. It is also necessary to cause the computer to jump from one instruction word to another depending upon the occurrence of a particular condition. Thus in the present case, status designators serve to retain a summary of important facts which apply to the most recent arithmetic process and which serve as the conditions which will cause a jump to occur. These conditions are whether the result was 0, whether the result was positive, and also whether the operation produced a carry past bit 17. If any of these conditions occur, either the carry, the 0 or the positive status designator will be set. Certain function codes from the function code register 14 are then ANDed with each of the outputs from the status designators and if the status designators are set, a signal is produced which causes the computer to jump to the next instruction.

Unconditional jump

FIG. 18 discloses the circuitry necessary to cause the conditional and unconditional jump signals. Flip-flop 774 produces the jump signal on line 360 whenever it is set by a signal on line 776 from AND gate 778. AND gate 778 will produce an output whenever main pulse 10 appears on line 780 and AND gate 782 produces an output on line 784. AND gate 782 will produce an output on line 784 whenever a signal appears on line 786 representing the $I_2$ sequence and AND gate 788 provides an output on line 790. AND gate 788 will produce a signal on line 790 whenever it has as inputs a signal on line 792 representing function code 1XI and an output from OR gate 794 on line 796. One of the inputs to OR gate 794 is the function code signal X4 on line 798. This signal is the unconditional jump signal and when ANDed in AND gate 788 with function code 1XI the output of AND gate 788 on 790 represents function code 14I. When the signal representing function code 14I is combined in AND gate 782 with the $I_2$ sequence signal on line 786 the output appears on line 784 which, when main pulse 10 appears on line 780, causes AND gate 778 to produce a signal which sets flip-flop 774 causing an unconditional jump signal to appear on line 360.

Conditional jump

The conditional jump signals are produced by AND gates 802, 804 and 806 on lines 808, 810 and 812, respectively. A jump signal will be produced by AND gate 802 if function code X5 appears on line 814 and the carry designator 816 is set and producing a signal on line 818.

Set carry status designator

Carry status designator 816 is set by AND gate 820 which produces a pulse on line 822. AND gate 820 will produce a pulse on line 822 when it has as inputs on line 824 a signal caused by the proper sequence and function codes and a signal on line 826 which represents the condition needed to cause a jump. Thus a signal will appear on line 826 if a carry signal is produced by the last stage in adder 16 thus indicating that the the carry signal has been propagated through the last adder stage. The signal on line 824 to AND gate 820 is produced by AND gate 828 as follows. Main pulse 10 clock signal on line 780 in conjunction with the pulse on line 832 produced by OR gate 830 causes AND gate 828 to produce a signal on line 824. OR gate 830 will produce an output when either of AND gates 834 or 836 produce outputs on lines 838 and 840 respectively. AND gate 834 will produce an output on line 838 when the $A_2$ sequence is in progress and producing a signal on line 842 and when either of the function codes 04–07I or 12II is producing a signal on line 844. AND gate 836 will produce an output on line 840 when the $Y_2$ sequence is in progress and is producing a signal on line 846 and function codes 10 or 11I are producing signals on line 848.

Set zero status designator

Zero status designator 850 will be set by a signal on line 854 from AND gate 852 if it has as one of its inputs a signal on line 856 from AND gate 858. AND gate 858 will produce a signal when all stages of the adder 16 are producing "0's." Thus if stages 1–18 of adder 16 all have "0" outputs, AND gate 858 will produce a signal on line 856 to AND gate 852. The second input to AND gate 852 comes from AND gate 828 which will produce a signal as described above.

Set positive status designator

Positive status designator 860 will be set when AND gate 862 produces a signal on line 864. AND gate 862 will produce an output on line 864 when it has as inputs a signal on line 866 from stage 17 of the adder and a signal on line 824 from AND gate 828 which is derived as explained above.

Status designator summary

Thus it will be seen that flip-flop 774 will produce a jump signal on line 360 whenever function codes 1XI and X4 are combined in AND gate 788 to produce a signal on line 790 which represents function code 14I. This signal represents the unconditional jump signal. Flip-flop 774 will produce a conditional jump signal output on line 360 whenever any or all of the status designators, the carry, the zero or the positive flip-flops, are set and either of the function codes X5, X6 or X7 are present as outputs to AND gates 802, 804 and 806, respectively.

Clear jump flip-flop

Flip-flop 774 will always be cleared by a signal on line 868 from AND gate 870. AND gate 870 will produce an output signal whenever the $P_2$ sequence is in progress and presenting a signal on line 872 and main pulse 10 is present on line 780.

Clear status designators

The carry 0 and positive status designators are cleared by signals from AND gates 874, 876 and 878. These AND gates produce output signals whenever they have as inputs a main pulse 10 signal on line 780 and a signal on line 880 from AND gate 882. AND gate 882 will produce an output signal whenever it has inputs a signal on line 786 representing the $I_2$ sequence and a signal on line 884 representing 14–17I or that function codes 14–17I are not being used. Thus, the signal is a "0" when either of the function codes 14–17I are being used. These four function code signals represent the unconditional jump and and the three conditional jump signals commands. If any one of them is being used, it is not desired that the status designator should be cleared. Therefore, a zero will appear on line 884 and AND gate 882 will not have an output which could clear the status designators. However, if any other function code is being used, then a "1" would appear on line 884 causing AND gate 882 to have an output during the $I_2$ sequence, and thus, when main pulse 10 is applied to AND gates 874, 876 and 878 these AND gates will produce a signal clearing all status designators.

Jump circuit summary

It has been shown that the circuitry in FIG. 18 will produce a jump signal at its output under one of four conditions. First, it will produce an unconditional jump signal whenever function code 14I is being used. Second, it will produce a conditional jump if the carry status designator is set. Third, it will produce a conditional jump if the zero status designator is set. Fourth, it will produce a conditional jump if the positive status designator is set. It must be understood, however, that the proper function code must also be present and combined with the outputs of the status designators to cause the conditional jumps to occur.

Adder to memory inhibit

As stated previously the output of each of the stages of adder 16 is connected to the appropriate write lines of memory 2. In order that the output of the adder may be gated into the memory at the proper time the signals from each stage in the adder passes through a gate in inhibit circuit 33 shown in FIG. 19. In order to prevent the drawings from becoming unduly complex, only 3 gates 886, 888 and 890 are shown instead of 18 gates. The inputs to these gates from adder 16 are shown on lines 892, 894 and 896. If flip-flop 898 is set, it will provide an output on line 900 which is coupled to each of AND gates 886, 888 and 890 which will cause them to transfer the information from adder 16 on lines 892, 894 and 896 to the write lines of the memory. Flip-flop 898 will be set by a pulse on line 902 from AND gate 904 if AND gate 904 has as inputs main pulse 9 on line 906 and a pulse on line 908 from RUN flip-flop 34 (shown in FIG. 4). Flip-flop 898 is always cleared upon the application of main pulse 13 to the clear side of the flip-flop. Thus it will be seen that when RUN flip-flop 34 (shown in FIG. 4) is set, gates 886, 888 and 890 will be enabled by flip-flop 898 allowing them to transfer the information from adder 16 to the momory and will always be inhibited by main pulse 13 regardless of the sequence through which the computer is operating.

General computer operation summary

FIG. 20 is similar to FIG. 1 except that it shows the general connections between the elements of the computer. Summarizing the invention and referring to FIG. 20, operations are commenced by closing star switch 32. This switch sets RUN flip-flop 34, the output of which causes Sequencer 18 (shown in FIG. 4) to enter the P sequence. The signal representing the P sequence is coupled to the Fixed Address flip-flop circuitry 1 (shown in FIG. 6) which forces the drive lines to a selection of the programmed address stored in the P register 4 of memory 2. The P register contains the address of the instruction word desired and this information is read out of P Register 4 on lines 3 and 5 to the Z or buffer register 8 under the control of the memory of Z circuitry 24 (shown in FIG. 8).

Since the P register 4 contains the address of the instruction word, once the information has been read out of the P register, it must be incremented and restored to the P register in order that it might contain the address of the next instruction word. Therefore, the word in the Z register 8 must have a "1" added to it and be restored in the P register. Since the output of the Z register 8 is connected directly to the adder 16 and since the X register 12 has been previously set to all "0's," carry circuitry 29 generates a 1 which is added to the sum of X and Z in adder 16 and the result restored in P register 4.

The S register control circuitry 25 (shown in FIG. 11) causes the first 14 bits of the Z register 8 to be transferred to S register 10. The output of S register 10 is coupled directly to the read drive lines of the memory 2. It should be understood that the memory drive lines have gates on their inputs to which both the Fixed Address F/F circuitry and the S register output is connected. When the Fixed Address F/F circuitry is energized, they cause certain of the gates on the input drive lines to be operated to force the drive lines to select the address of either the P or A register in the memory. When these gates are not controlled by the Fixed Address F/F circuitry, the output of the S register controls which drive lines will be energized and, thus, which memory address is selected. Thus, in effect the output of the S register causes the instruction word to be read out in lines 3 and 5 to Z register 8 which has previously been cleared by clear Z circuitry 21 (shown in FIG. 9). The instruction word which is now stored in register 8 contains two portions, the first of which contains the function code and the second of which contains the operand address in the memory. The bits representing the function code are transferred to the F register 14 (shown in FIG. 5) which translates those bits into a series of instruction signals which are connected to various elements throughout the computer. The operand portion of the instruction word stored in Z register 8 is transferred to S register 10 which has been cleared by control circuitry 25 (shown in FIG. 11). S register 10 (shown in FIG. 10) now contains the address of the operand or data word to be used as determined by the function code stored in Function Code Register 14. The output of the S register on line 11 causes this data or operand word to be transferred from the memory to the Z register 8 which was previously cleared by circuitry 21. The data word now stored in Z register 8 may be acted upon in several ways depending upon the instruction stored in F register 14. If it is desired, for instance, to increment this number by 1 and restore it in the memory, X, register 12 will be set by the circuitry 27 (shown in FIG. 13) thus causing all "0's" to be present at the outputs of the stages of X register 12. The information then stored in Z register 8 and X register 12 will be coupled to adder 16 (shown in FIG. 14) where carry circuit 29 (shown in FIG. 16) will cause a "1" to be added to the sum of the X and Z registers. This sum will be fed from each of the outputs of the stages of adder 16 on cable 13 through the circuitry 33 (shown in FIG. 19) where gates will be enabled allowing the data to pass into the memory 2. If further arithmetic functions are to be performed with the data word stored in Z register 8, it will be transferred to X register 12 by circuitry 27 (shown in FIG. 13). If F register 14 contains proper instructions, Sequencer 18 will enter the P sequence, overriding the instruction in S register 10, forcing Fixed Address circuitry 1 to the Accumulator register 6 in memory 2 causing the data stored there to be read out on lines 3 and 5 to Z register 8 which was previously cleared by circuitry 21. The information now stored in the Z register 8 and in X register 12 may be utilized in various arithmetic operations. If the function code in the F register 14 so indicates, Adder 16 may perform a half-add of the data stored in Z register and Z register 12. This half-add will be caused by the output of half-add circuitry 31 (shown in FIG. 17). Further depending upon the result stored in adder 16, that is whether the result was 0, whether the result was positive or whether the operation produced a carry past the last stage in adder 16, jump circuitry 35 (shown in FIG. 18) may be energized to produce a jump signal which will operate upon circuits 21 and 24 (shown in FIGS. 9 and 8, respectively) to cause the computer to jump to the next instruction word. Timing unit 23 (shown in FIG. 3) provides clock pulse 1–16 to distribute it to the elements of the computer to provide proper timing.

The programmers console 37 contains one light for each stage of the X register thus at all times indicating the state of each stage of the X register.

The computer may accept data from or deliver data to peripheral equipment through input amplifiers 39 or output amplifiers 41. AND gate 35 will produce an input amplifier to Z control signal which will open gates (shown in FIG. 7) which will allow the data from the input amplifiers to be transferred into the stages of the Z register. The control circuitry 35 has as inputs main pulse 5 from timing unit 23 and an appropriate control pulse from an input/output unit, not shown, since it is not a part of this invention. Further a signal from the input/output control circuitry will also gate the output of amplifiers 41 to the external equipment.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:

1. A computer comprising:
   sequencer means capable of generating sequence enabling signals representing four distinct operational sequences,
   memory means having sections adapted to store an instruction word, an instruction word address and data words at directly addressable locations therein,
   instruction address retrieving means coupled to said memory and said sequencer means for retrieving and storing an instruction word address during a first of said operational sequences,
   instruction retrieving means coupled to said instruction address retrieving means, said sequencer means and said memory for utilizing said address to retrieve and temporarily store an instruction word from said memory during a second of said operational sequences, said instruction word having at least a function portion, and an address portion,
   first means coupled to said instruction retrieving means, said sequencer means, and said memory for utilizing the address portion of said instruction word to retrieve and store a first data word from said memory during a third of said operational sequences,
   second means coupled to said memory, said sequencer means and said instruction retrieving means for effecting retrieval and storage of a second data word from said memory during a fourth of said operaitonal sequences,
   and arithmetic means coupled to said first and second means for performing arithmetic operations on said first and second data words in accordance with said function portion of said instruction word during a fourth of said operational sequences, said sequencer means including control means coupled to said function portion of said instruction retrieving means for determining the order of said operational sequences in accordance with said function portion and the immediately preceding active one of said operational sequences.

2. A computer comprising:
   sequencer means for producing four sequence enabling signals for initiating operational sequences in a selected one of a plurality of predetermined orders, memory means with directly addressable registers for storing words including data words, an instruction word address and instruction words, said instruction words including an operand address portion and a function code portion, first, second, third and fourth transient storage registers external to said memory means, said first register being coupled to said memory means, and to said second, third and fourth registers, first means coupled to said sequencer means and said memory means for utilizing a first of said sequence enabling signals to retrieve said address word from said memory means and temporarily store it in said first register;

second means directly coupled to said first register and said sequencer means and activated by said first of said sequence enabling signals to increment said address word, third means directly coupling said second means to said memory for storing said incremented address word in said memory, fourth means coupled to said first register, said second register and said sequencer means for using said first sequence enabling signal to transfer said address word from said first register to said second register and to clear said first register, said first means coupled to said second register for utilizing said address word to retrieve said instruction word from said memory and temporarily store it in said first register when activated by a second of said sequence enabling signals, said fourth means utilizing said second of said sequence enabling signals to transfer said operand address portion of said instruction word from said first register to said second register, fifth means connected to said signal producing means for utilizing said second of said sequence enabling signals to transfer said function code portion of said instruction word from said first register to said third register, said fourth means including circuitry for clearing said first register, said first means utilizing the address portion of said instruction word in said second register to retrieve a first data word from said memory and temporarily store it in said first register when activated by a third of sequence enabling signals, sixth means connected to said sequencer means and said fourth register for utilizing said third of said sequence enabling signals to transfer said first data word from said first register to said fourth register, said fourth means clearing said first register, said first means including means responsive to a fourth of said sequence enabling signals for retrieving a second data word from said memory and temporarily storing it in said first register, said second means coupled to said first and fourth registers and said sequencer means for utilizing said fourth of said sequence enabling signals to perform arithmetic operations on said first and second data words stored in said first and fourth registers, and said third means coupling said second means to said memory means for storing the result of said arithmetic operations directly in said memory.

3. A computer as in claim 2 including:

clock means coupled to said signal generating means for automatically resuming said first sequential operation after said fourth sequential operation is terminated.

4. A computer comprising:

sequence means capable of initiating four operation enabling signals representing four distinct operational sequences, the order of occurrence of said enabling signals being selectively alterable, memory means adapted to store instruction words comprising function portions and address portions, an instruction word address, and data words at directly addressable words therein, first means coupled to said memory and said sequencer means for retrieving and storing an instruction word address during a first of said operational sequences, second means coupled to said first means, said memory means and said sequencer means for storing and utilizing said address to retrieve an instruction word from said memory and store it in said first storage means during a second of said operational sequences, third means coupled to said first means and said memory means to receive said function portion of said instruction word during a second of said operational sequences, said second means storing said address portion of said instruction word during said second sequence, fourth means coupled to said first means and adapted to receive a first data word stored therein during a third of said operational sequences in accordance with said address portion of said instruction word stored in said second means, said first means storing a second data word from said memory in accordance with said function portion of said instruction word stored in said third means during a fourth of said operational sequences;

arithmetic means coupled to said first, third and fourth means for performing arithmetic operations on said first and second data words stored in said fourth and said first means respectively in accordance with the function portion of said instruction word stored in said third means, and means directly coupling said arithmetic means to said memory means for storing the said result of said arithmetic operation in said memory.

5. For use in a stored program computer having addressable memory apparatus including directly addressable registers for storing words including data words, an instruction address indicative of the next instruction to be executed, and instruction words, each including a data word adress portion and a function portion indicative of the particular function to be performed, control apparatus comprising:

first means including first fixed address means for accessing a fixed register in the memory apparatus designated to store the instruction address, said first means for procuring an instruction word to be executed in accordance with the instruction address;

function register means coupled to said first means for storing the function code portion of the instruction word procured;

sequencer means capable of producing a plurality of sequence enabling signals for initiating discrete operational sequences, said sequencer means including control means coupled to said function register means for causing said sequencer means to provide said sequence enabling signals in one of a plurality of predetermined orders, the one of said orders provided being determined by said function code portion of the instruction being executed, thereby controlling the execution of the instruction word.

6. Control apparatus as in claim 5 and further including second fixed address means coupled to said sequencer means for accessing a fixed accumulator register in the memory apparatus in response to a predetermined one of said plurality of sequence enabling signals.

7. A computer having in combination:

addressable memory means having addressable storage registers for storing data words and instruction words, said instruction words being selected from a predetermined repertoire of instruction types and each identified by a unique function code, said addressable memory means including a program address register and an accumulator register, and reading means for reading signals from addressed ones of said registers and recording means for recording signals in addressed ones of said registers;

timing means for generating regularly occurring timing pulses for controlling in part the operation of the computer;

transfer storage means coupled to said addressable memory means for at least temporarily storing said data and instruction words as they are read from said addressable memory means, said transfer storage means including an address storage portion and a function storage portion;

function storage means coupled to said function storage portion for at least momentarily storing the signal combinations indicative of said function code of the computer function to be executed;

storage address means coupled to said address storage portion for at least momentarily storing the address of the one of said registers to be accessed;

register gate means for accessing the selected ones of said registers, said register gate means including input means coupled to said storage address means for accessing said addressable storage registers, and override accessing means for receiving addressing signals indicative of the address selection of said program address register and said accumulator register;

fixed address circuitry means having first output means coupled to said overriding access means for forcing said program address register to be accessed and second output means coupled to said overriding access means for forcing said accumulator register to be accessed, said fixed address circuitry means including input means for receiving ones of said timing pulses, and program address register selection input means for receiving sequence selection signals for initiating the forced selection of access to said program address register, and accumulator register selection input means for receiving sequence selection signals for initiating the forced selection of access to said accumulator register;

sequencer means having input means coupled to said timing means and said function storage means for receiving said timing pulses and said function codes, said sequence means including first sequence means coupled to said program address register selection input means for providing first sequence signals for forcing said program address register to be accessed and the address stored therein to be transferred through said transfer storage means to said storage address means;

second sequence means activated in part by said first sequence means and coupled to said register gate means for providing second sequence signals for causing the instruction word stored in the addressable register accessed in response to said first sequence signal to be transferred through said transfer storage means, said function code being directed to said function storage means and the address being directed to said storage address means, third sequence means activated by first predetermined ones of said instruction word types for providing third sequence control signals for alternatively causing the data word to be read from said addressable storage register or recorded in said addressable storage register defined by the memory address in said storage address means in response to respective ones of said function codes, and fourth sequence means coupled to said accumulator register selection input means for providing fourth sequence signals in response to second predetermined ones of said instruction word types for forcing said accumulator register to be accessed, said sequencer means further including control means coupled to said function storage means for causing said first, second, third and fourth sequence means to be activated in predetermined variable sequence in response to the ones of said function codes stored in said function storage means and the one of said first, second, third, and fourth sequence means active during the next preceding sequence period, wherein said first and second sequence signals occur in each instruction execution cycle and the order and occurrence of said third and fourth sequence signals are dependent on the nature of said function codes.

References Cited
UNITED STATES PATENTS 2,777,635   1/1957   Tootill _____ 235—61

ROBERT C. BAILEY, *Primary Examiner.*

R. ZACHE, *Assistant Examiner.*